US012281678B2

(12) United States Patent
Rancourt et al.

(10) Patent No.: US 12,281,678 B2
(45) Date of Patent: Apr. 22, 2025

(54) TETHERED PAYLOAD MOTION CONTROL AND CABLE ROBOT USING MAGNETORHEOLOGICAL ACTUATORS

(71) Applicants: SOCIETE DE COMMERCIALISATION DES PRODUITS DE LA RECHERCHE APPLIQUÉE SOCPRA SCIENCES ET GENIE S.E.C., Sherbrooke (CA); EXONETIK INC., Sherbrooke (CA)

(72) Inventors: David Rancourt, Grand-Mere (CA); Alexis Lussier Desbiens, Sherbrooke (CA); Jean-Sebastien Plante, Sherbrooke (CA); Pascal Larose, Sherbrooke (CA)

(73) Assignees: SOCIETE DE COMMERCIALISATION DES PRODUITS DE LA RECHERCHE APPLIQUEE SOCPRA SCIENCES ET GENIE S.E.C., Sherbrooke (CA); EXONETIK INC., Sherbrooke (CA)

( * ) Notice: Subject to any disclaimer, the term of this patent is extended or adjusted under 35 U.S.C. 154(b) by 1420 days.

(21) Appl. No.: 16/642,495

(22) PCT Filed: Aug. 29, 2018

(86) PCT No.: PCT/CA2018/051044
§ 371 (c)(1),
(2) Date: Feb. 27, 2020

(87) PCT Pub. No.: WO2019/041038
PCT Pub. Date: Mar. 7, 2019

(65) Prior Publication Data
US 2020/0182310 A1    Jun. 11, 2020

Related U.S. Application Data

(60) Provisional application No. 62/579,532, filed on Oct. 31, 2017, provisional application No. 62/551,592, filed on Aug. 29, 2017.

(51) Int. Cl.
*F16D 37/02* (2006.01)
*B64D 1/22* (2006.01)
(Continued)

(52) U.S. Cl.
CPC ............... *F16D 37/02* (2013.01); *B64D 1/22* (2013.01); *B66C 13/085* (2013.01); *B66D 1/14* (2013.01);
(Continued)

(58) Field of Classification Search
CPC . B64D 1/22; B64D 1/12; B64D 17/22; B66D 1/14; B64U 2101/60; B64U 70/30;
(Continued)

(56) References Cited

U.S. PATENT DOCUMENTS 3,753,552 A    8/1973  Barron
3,801,071 A *  4/1974  Barron .................... B63B 21/56
                                                    254/273
(Continued)

FOREIGN PATENT DOCUMENTS

CN      202625690 U  * 12/2012
DE    102015105517 A1    6/2016
(Continued)

OTHER PUBLICATIONS

Translation of CN202625690U (Year: 2012).*
(Continued)

*Primary Examiner* — Richard Green
*Assistant Examiner* — Steven J Shur
(74) *Attorney, Agent, or Firm* — NORTON ROSE FULBRIGHT CANADA LLP

(57) ABSTRACT

A system for controlling a tension of a tether between an object and a load tethered to the object comprises magnetorheological (MR) fluid actuator unit(s) including at least one torque source and at least one MR fluid clutch apparatus
(Continued)

coupled to the at least one torque source to receive torque from the at least one torque source, the MR fluid clutch apparatus controllable to transmit a variable amount of torque via an output of the MR fluid actuator unit. A tensioning member is connected to the output so as to be pulled by the output member upon actuation of the magnetorheological fluid clutch apparatus, a free end of the tensioning member adapted to exert a pulling action when being pulled by the output member. Sensor(s) provide information indicative of a relation between the object and the load tethered to the object. A controller controls the at least one MR fluid clutch apparatus in exerting the pulling action based on said information.

17 Claims, 16 Drawing Sheets

(51) Int. Cl.
| | |
|---|---|
| B66C 13/08 | (2006.01) |
| B66D 1/14 | (2006.01) |
| B66F 19/00 | (2006.01) |
| F16D 48/06 | (2006.01) |
| B64U 10/14 | (2023.01) |
| B64U 101/64 | (2023.01) |
| B64U 101/67 | (2023.01) |
| F16D 37/00 | (2006.01) |

(52) U.S. Cl.
CPC .............. *B66F 19/00* (2013.01); *F16D 48/06* (2013.01); *B64U 10/14* (2023.01); *B64U 2101/64* (2023.01); *B64U 2101/67* (2023.01); *F16D 2037/004* (2013.01); *F16D 2500/10475* (2013.01); *F16D 2500/3027* (2013.01)

(58) Field of Classification Search
CPC .... F16D 37/02; F16D 48/06; F16D 2037/004; F16D 2500/10475; F16D 2500/3027; B66C 13/085; B66F 19/00
See application file for complete search history.

(56) References Cited

U.S. PATENT DOCUMENTS

| | | | |
|---|---|---|---|
| 4,248,394 | A | 2/1981 | Klumpp |
| 5,970,906 | A | 10/1999 | Hrescak et al. |
| 8,308,142 | B1 | 11/2012 | Olson |
| 2017/0066530 | A1* | 3/2017 | Salzmann ............... B64C 27/04 |

FOREIGN PATENT DOCUMENTS

| | | | | |
|---|---|---|---|---|
| FR | 2618503 | A1 | 1/1989 | |
| KR | 101640362 | B1 | 7/2016 | |
| WO | 2016134472 | A1 | 9/2016 | |
| WO | WO-2016187719 | A1 * | 12/2016 | ............. A61G 1/042 |
| WO | 2017078118 | A1 | 5/2017 | |
| WO | 2019204917 | A1 | 10/2019 | |

OTHER PUBLICATIONS

Sijo Jose (A. Sijo Jose., "Artificial magneto rheological fluid clutch," IEEE—International Conference on Advances in Engineering, Science and Management (ICAESM—2012), Nagapattinam, India, 2012, pp. 104-110. <https://ieeexplore.ieee.org/document/6216243>) (Year: 2012).*

* cited by examiner

TETHERED PAYLOAD MOTION CONTROL AND CABLE ROBOT USING MAGNETORHEOLOGICAL ACTUATORS

CROSS-REFERENCE TO RELATED APPLICATION

The present application claims the priority of U.S. Patent Application No. 62/551,592, filed on Aug. 29, 2017 and of U.S. Patent Application No. 62/579,532, filed on Oct. 31, 2017, both of which are incorporated herein by reference.

FIELD OF THE APPLICATION

The present application relates generally to magnetorheological (MR) fluid clutch apparatuses, to cable-driven systems and more particularly to a dynamic motion control of a tethered payload using such apparatuses.

BACKGROUND OF THE ART

Payload lifting using aircraft have been used for decades. For example, slung loads under helicopters are extensively used to deliver payloads in difficulty accessible areas, in collaborative load lifting using aircraft (e.g., quadcopters used to lift particularly heavy or voluminous loads). Fixed-wing aircraft and aerostats are also used to lift payloads. Recently, drones have been extensively used to lift various payload, including camera equipment.

A slung load under an helicopter is a simple approach to carry a large payload of any type. However, the maximum velocity at which the payload can be towed is limited by the dynamic motion of the payload due to unsteady aerodynamics on the bluff body. One common approach is to use a single attachment point on the helicopter to minimize pitching and/or rolling moments on the aircraft with multiple tethers. However, under specific conditions, using attachment points could lead to more accurate payload position delivery and an increase in the cruise speed of the aircraft.

Alternatively, collaborative load lifting using multiple aircraft, such as quadcopters, show significant advantages. As an example, it is possible to prevent blowing air on a sensitive payload. However, in collaborative load lifting, the tethered aircrafts may be sensitive to wind gust, and therefore, may create large detrimental payload motion or change the load repartition between the involved aircraft. The payload remains sensitive to wind gust since the system is typically not controlled in tension.

Cable robots, are a type of robotic end-effector or manipulator that may be used for various manipulation tasks in a three-dimensional (3D) workspace. Cable robots have included multiple cables attached to a mobile end-effector platform that may carry one or more end-effectors. The end-effector platform is manipulated by motors that can extend or retract the cables. Generally, cable robots are relatively inexpensive and easy to transport, disassemble and reassemble. Cable robots have been used for a variety of applications, including material handling, haptics, among other examples.

Based on the degree to which the cables determine the pose (position and orientation) of the end-effector platform, cable robot systems may be classified as fully-constrained or underconstrained. In the fully-constrained case the pose of the end-effector can be completely determined given the current lengths of the cables. Fully-constrained cable robots have been designed for applications that require high precision, high speed/acceleration or high stiffness. Utilizing the characteristics of large workspace and high dynamics, a high-speed cable robot may produce high speeds over large workspace. However, high accelerations together with inertia inherent to high-speed manipulations can affect winch position tracking performance, which, in turn, may cause tension distribution changes. To achieve good performance at high speeds, it is desired to analyze and minimize the effects of winch tension distribution. Current driving method of cable that are usually based on position tracking errors that induce tension discrepancies in the system may create payload position error.

SUMMARY OF THE APPLICATION

It is therefore an aim of the present disclosure to provide a novel system for controlling a tension of a tether between an object and a load tethered to the object.

It is a further aim of the present disclosure to provide a novel method for controlling a tension of a tether between an object and a load tethered to the object Therefore, in accordance with a first embodiment of the present disclosure, there is provided a system for controlling a tension of a tether between an object and a load tethered to the object comprising: at least one magnetorheological (MR) fluid actuator unit including at least one torque source and at least one MR fluid clutch apparatus coupled to the at least one torque source to receive torque from the at least one torque source, the MR fluid clutch apparatus controllable to transmit a variable amount of torque via an output of the MR fluid actuator unit; a tensioning member being connected to the output so as to be pulled by the output member upon actuation of the magnetorheological fluid clutch apparatus, a free end of the tensioning member adapted to exert a pulling action when being pulled by the output member; at least one sensor for providing information indicative of a relation between the object and the load tethered to the object; and a controller for controlling the at least one MR fluid clutch apparatus in exerting the pulling action based on said information.

Further in accordance with the first embodiment, the output member and the tensioning member are for instance any one of a wheel, drum or pulley and cable or tendon, and a chainring and chain.

Still further in accordance with the first embodiment, the at least one sensor includes for instance at least one inertial sensor adapted to determine an acceleration of at least one of the object and the load.

Still further in accordance with the first embodiment, the at least one sensor includes for instance at one of a global navigation satellite system and of a GPS device to determine at least a location of at least one of the object and of the load.

Still further in accordance with the first embodiment, a gear reduction system is for instance between the torque source and the at least one MR fluid clutch apparatus.

Still further in accordance with the first embodiment, the free end of the tensioning member is for instance connected to one of the object and of the load, and wherein the at least one of the MR fluid actuator unit is connected to the other of the of the object and of the load.

Still further in accordance with the first embodiment, the object is for instance an aircraft tethering the load.

Still further in accordance with the first embodiment, a fixed tether cable is for instance connected between the object and the load, and in parallel to at least one tensioning set constituted of the MR fluid clutch apparatus and tensioning member.

Still further in accordance with the first embodiment, two of the at least one assembly are for instance on opposite sides of the fixed tether cable.

Still further in accordance with the first embodiment, at least one tensioning set is for instance constituted of one of the MR fluid clutch apparatus and tensioning member; and means are for instance configured to provide a force on the output antagonistic to a transmission of the pulling action of the at least one tensioning set on the output.

Still further in accordance with the first embodiment, the means for providing the pulling action is for instance another one of the tensioning set.

Still further in accordance with the first embodiment, at least two of the tensioning sets are for instance configured to share the torque sensor.

Still further in accordance with the first embodiment, the at least one tensioning set supports for instance the weight of the load whereby the means for providing the force is adapted to be gravity.

Still further in accordance with the first embodiment, the at least one sensor detects for instance at least one of a speed and an acceleration of one of the object and the load beyond a predetermined threshold from the information indicative of the relation, and the controller controls for instance the at least one MR fluid clutch apparatus to adjust a tension in the cable to isolate one of the object and the load from the speed and/or the acceleration.

In accordance with a second embodiment of the present disclosure, there is provided a method for controlling a force between an object and a load tethered to the object, comprising obtaining information indicative of a relation between the object and the load tethered to the object; characterizing the relation from the information; determining from the characterizing a level of action required to control the relation; controlling at least one MR fluid clutch apparatus to transmit a variable amount of torque via an output of the MR fluid actuator unit to control the force based on the level of action.

Still further in accordance with the second embodiment, obtaining information indicative of a relation includes for instance obtaining at least one of a speed and an acceleration of one of the object and the load.

Still further in accordance with the second embodiment, characterizing the relation from the information comprises for instance comparing the speed and/or acceleration to a predetermined threshold.

Still further in accordance with the second embodiment, determining the level of action comprises for instance determining to isolate one of the object and the load from the speed and/or the acceleration.

Still further in accordance with the second embodiment, the method for controlling a force is for instance performed to control a tension in at least one cable tether between the object and the load tethered to the object.

In accordance with a third embodiment of the present disclosure, there is provided a system for controlling a force between an object and a load tethered to the object, comprising a processing unit; and a non-transitory computer-readable memory communicatively coupled to the processing unit and comprising computer-readable program instructions executable by the processing unit for: obtaining information indicative of a relation between the object and the load tethered to the object; characterizing the relation from the information; determining from the characterizing a level of action required to control the relation; controlling at least one MR fluid clutch apparatus to transmit a variable amount of torque via an output of the MR fluid actuator unit to control the force based on the level of action.

BRIEF DESCRIPTION OF THE DRAWINGS

FIG. 10' is a schematic view of an MR fluid actuator unit using one of the MR fluid clutch apparatus of FIG. 1, the MR fluid actuator used to decouple the motor and speed reducer from the Rotary-to-Rotary or Rotary-to-Linear converter that may be used in a tethering arrangement of the present disclosure;

FIG. 10" is a schematic view of an MR fluid actuator unit using one or more of the MR fluid clutch apparatus of FIG. 1, all MR fluid actuators connected to the same speed reducer and actuating different Rotary-to-Rotary or Rotary-to-Linear converters that may be used in a tethering arrangement of the present disclosure;

DESCRIPTION OF THE PREFERRED EMBODIMENTS

Figure 1:
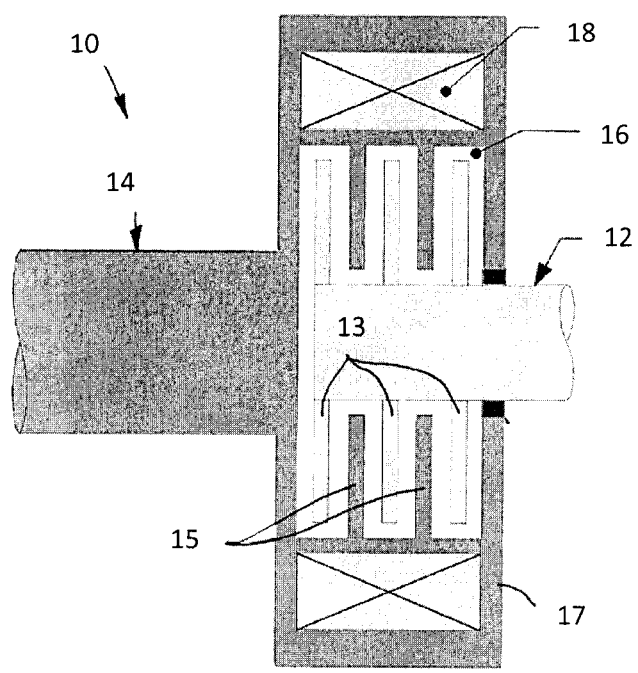
FIG. 1 is a schematic view of a magnetorheological fluid clutch apparatus used in cable-driven systems of the present disclosure.

Referring to the drawings and more particularly to FIG. 1, there is illustrated a generic magnetorheological (MR) fluid clutch apparatus 10 configured to provide a mechanical output force based on a received input current. The MR fluid clutch apparatus 10 of FIG. 1 is a simplified representation of a MR fluid clutch apparatus that may be used in the systems described hereinafter. The MR fluid clutch apparatus that is used in the systems described hereinafter may have additional components and features, such as drums, redundant electromagnets, MR fluid expansion systems, etc.

Figure 10:
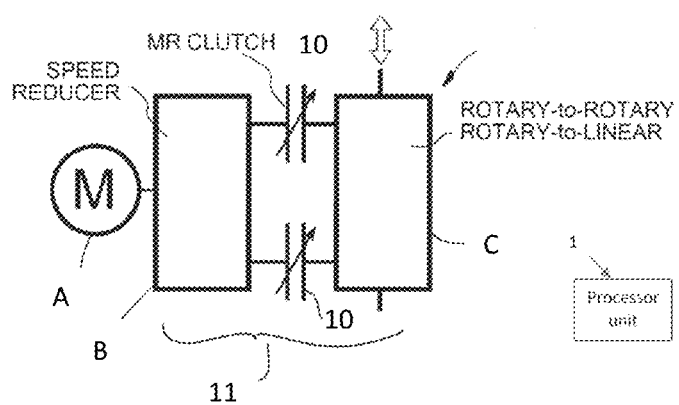
FIG. 10 is a schematic view of an MR fluid actuator unit using one or more of the MR fluid clutch apparatus of FIG. 1, both MR fluid actuators connected to the speed reducer and turning in opposite direction that may be used in a tethering arrangement of the present disclosure.
Figure 10:
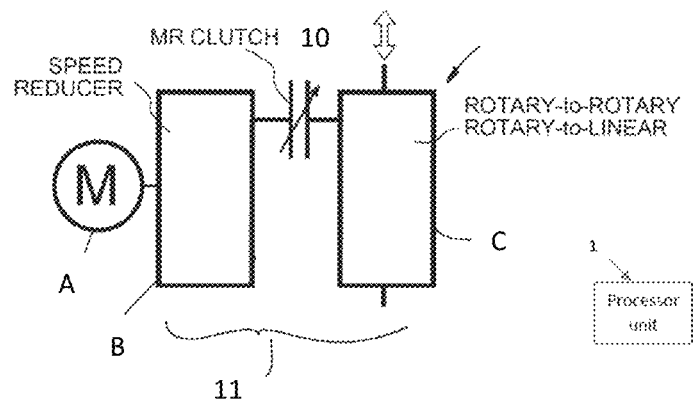
Figure 10:
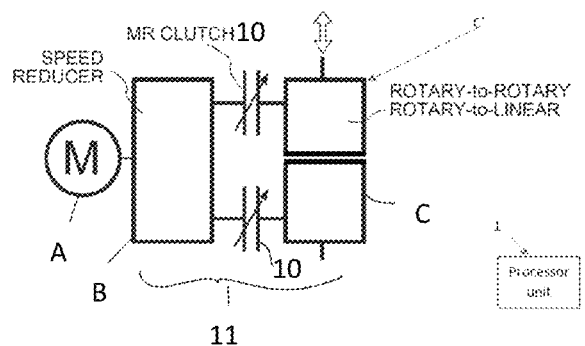

The MR fluid clutch apparatus 10 may be part of a MR fluid actuator unit 11 as shown in FIG. 10 and described in further detail hereinafter. The MR fluid clutch apparatus 10 has a driving member 12 with radial disks 13, this assembly also known as input rotor. The MR fluid clutch apparatus 10 also has a driven member 14 with annular plates 15 intertwined with the radial disks 13 to define an annular chamber(s) filled with an MR fluid 16, the annular chamber being delimited by a casing 17 that is integral to the driven member 14. The assembly of the driven member 14 and annular plates 15 is also known as the output rotor. In the example of FIG. 1, the driving member 12 may be an input shaft in mechanical communication with a power input, and driven member 14 may be in mechanical communication with a power output (i.e., force output, torque output). MR fluid 16 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the radial disks 13 on the drive side, and that of the annular plates 15 and of the walls of the casing 17 in the annular chamber 17. The magnetic field intensity mainly affects the yield shear stress of the MR fluid. The yield shear stress of the fluid when in its active ("on") state may be controlled by varying the magnetic field intensity produced by electromagnet 18 integrated in the casing 17, i.e., the input current, via the use of a controller. Accordingly, the MR fluid's ability to transmit force can be controlled with the electromagnet 18, thereby acting as a clutch between the members 12 and 14. The electromagnet 18 is configured to vary the strength of the magnetic field such that the friction between the members 12 and 14 is low enough to allow the driving member 12 to freely rotate with the driven member 14 and vice versa.

Figure 2:
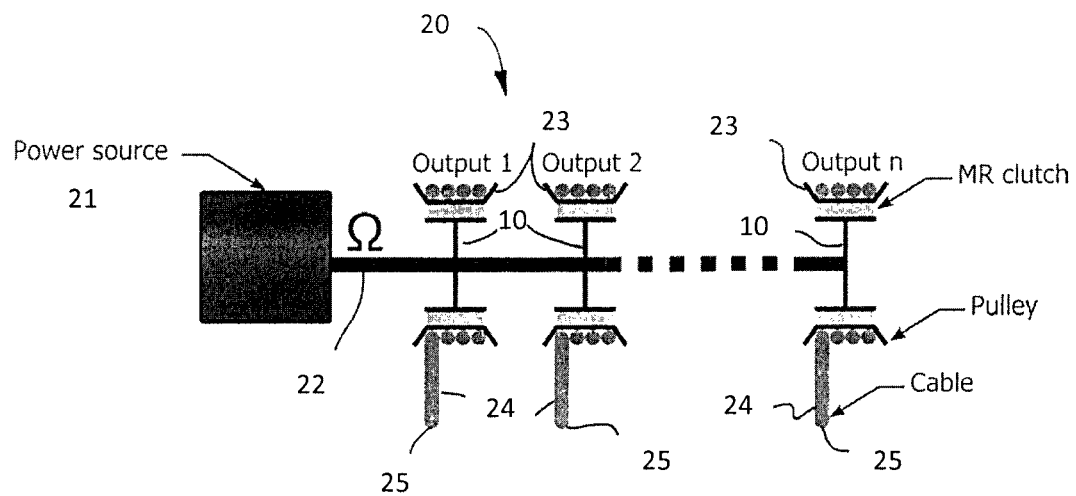
FIG. 2 is a schematic view of a power distribution arrangement in a cable-driven system in accordance with the present disclosure, using magnetorheological fluid clutch apparatuses.

Referring to FIG. 2, a cable-driven system in accordance with the present disclosure is generally shown at 20. The cable-driven system 20 has n MR fluid clutch apparatuses 10 receiving a torque input from a single power source 21 via a common power shaft 22 driven by the power source 21. For example, the power source 21 may be an electric motor, combustion engine such as a gas turbine a piston engine, etc, among numerous other types of power sources may be used, such as hydraulic motors to name one among numerous other examples.

The MR fluid clutch apparatuses 10 are each equipped with an output member 23 upon which is mounted a cable 24, to form a tensioning set. The output member 23 may practically be connected to the driven member 14 (FIG. 1) of the MR fluid clutch apparatuses 10 so as to rotate therewith. However, the output member may also have mechanisms between the driven member 14 and the output member 23 instead of being a direct drive. For example, the output member 23 may incorporate a reduction gearbox. The expression "output wheel" is used as an encompassing expression for equivalent parts, such as a pulley, a chainring, a sprocket, a nut, a screw, lever arm, etc. Likewise, the expression "cable" is used as an encompassing expression for equivalent parts, such as a tendon, rope, belt, chain, and like tensioning members. The selection of the type of cable is based on the type of output wheel. The cable 24 has an end attached to the output wheel 23, a free end 25 attached to an output component, with a length of the cable being wound about the output wheel 23. A rotation of the output wheel 23, for instance as driven by the driven member 14 (FIG. 1), may wind additional cable length onto the output wheel 23, resulting in a pulling action at the free end of the cable 24. A pulling action on the free end 25 may alternatively result in an unwinding of the cable 24 from the output wheel 23, for instance when the MR fluid clutch apparatus 10 is in a slippage condition, i.e., when the pulling action on the free end 25 exceeds the force produced by the driven member 14. The cable-driven system 20 has n outputs for a single degree of actuation. Using continuous-slippage MR fluid clutch apparatuses 10 as tensioners in the cable-driven system 20 allows torque distribution from a single power source 21 amongst many outputs in order to drive possibly multiple DOFs. Although the MR fluid clutch apparatuses 10 can only produce torque in the direction they are being driven by the power source 21, this is not an issue in the case of cable-driven systems because of the cables' intrinsic inability to effectively transmit compressive loads.

Figure 3:
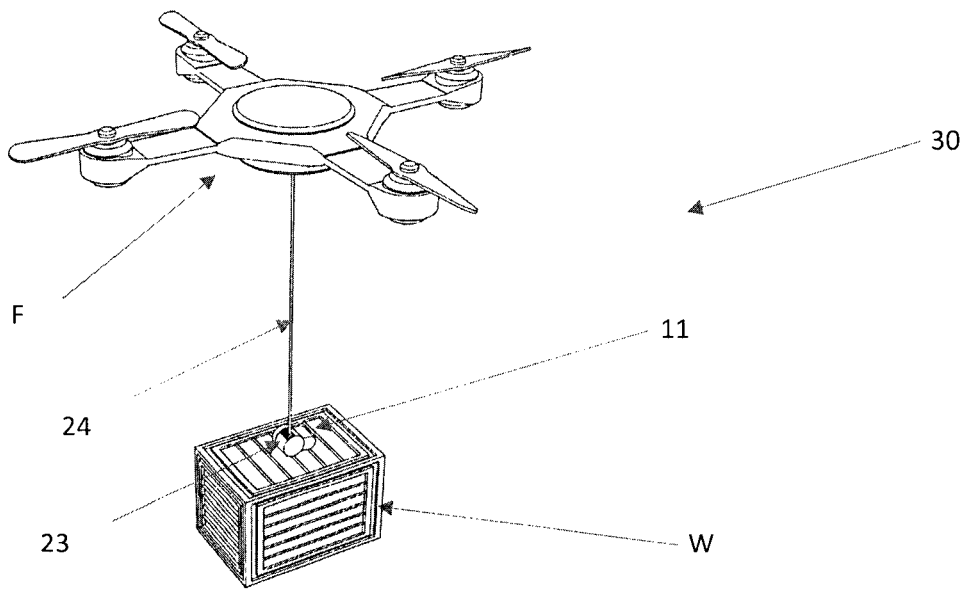
FIG. 3 is a schematic view of a tethered payload motion control system using magnetorheological fluid clutch apparatuses for displacement control in a single DOF of a payload.

Referring to FIG. 3, the general configuration with the main component of the payload motion control system 30 using a single tether shown as cable 24 coupled to a single magnetorheological (MR) fluid actuator unit 11 featuring a MR fluid clutch apparatus 10 is represented, to support a payload W tethered to an aircraft F, schematically shown as a quadcopter but embodied as a rotorcraft and/or a drone, etc as well. In this case vertical control of the load position may be achieve by the MR fluid actuator unit 11 and the vertical position of the payload W may be partially decoupled from the position of the aircraft F. Such MR fluid actuator unit 11 may be useful to control the vertical position of a payload while loading on or unloading from the ground. Additionally, the configuration of FIG. 3 may be used to decouple small vertical displacements of a rotorcraft cause by the main rotor, acting like an active suspension for the payload W. The MR fluid actuator unit 11 varies the length of the tether 24 by reeling the tether 24 on a drum 23 serving as the output of the MR fluid actuator unit 11. Although shown as being on the payload W in FIG. 3, the MR fluid actuator unit 11 may be on the aircraft F as well.

Figure 4:
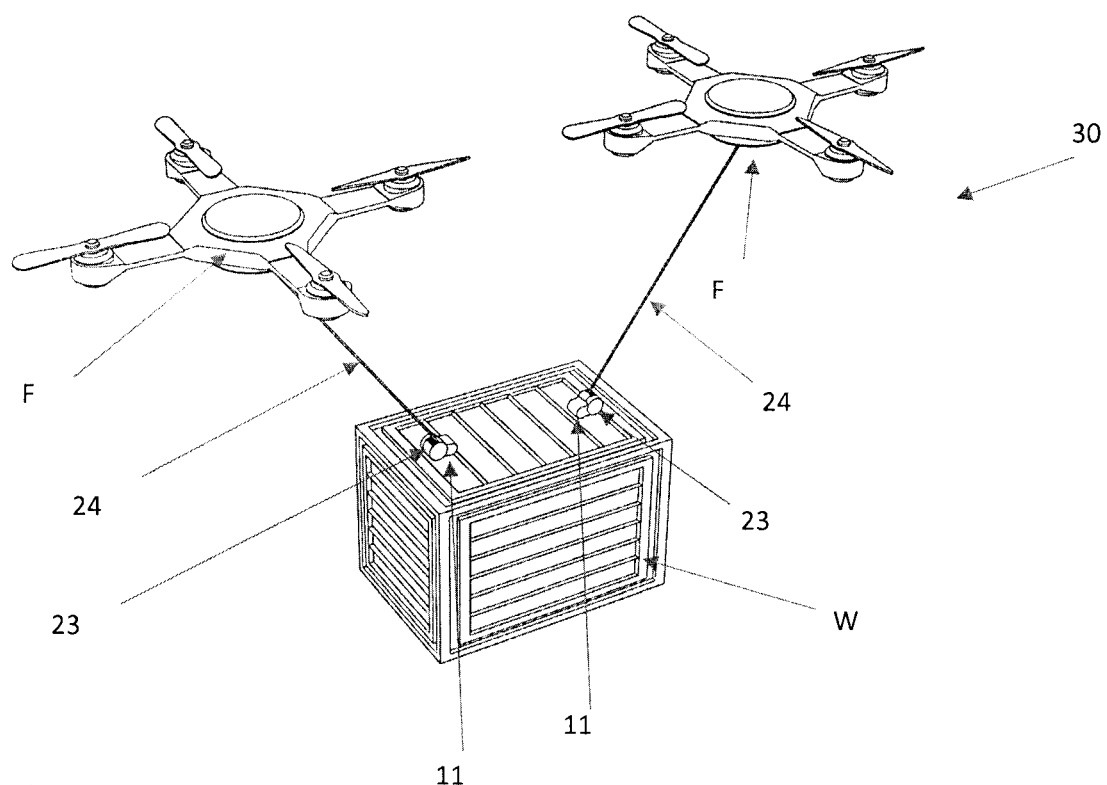
FIG. 4 is a schematic view of a tethered payload motion control system using two aircraft and magnetorheological fluid clutch apparatuses for displacement control of a payload in two DOF attached to the aircraft.

Referring to FIG. 4, the general configuration with the main component of the payload motion control system 30 using multiple tethers 24 coupled to multiple MR fluid actuator units 11 each featuring one or more of the MR fluid clutch apparatus 10 is represented in a collaborative load lifting system. In the case of a collaborative load lifting system, one or more aircraft F are tethering a payload. A sensor or a set of sensors 26 such as an inertial measuring unit (IMU) with any arrangement of accelerometer(s), gyroscope(s), inclinometer(s), etc, a global navigation satellite system (GNSS), and/or a global positioning system (GPS) may be used to detect the payload position, velocity, direction and/or acceleration. The sensor(s) 26 may be on the payload W, on the MR fluid actuator unit(s) 11, on the output 23, on the tether 24 and/or on the aircraft F. For simplicity, a sensor(s) 26 is generally shown as being on the payload W and/or on the aircraft F in FIGS. 3 and 4, though it may be elsewhere as recited above. FIGS. 3 and 4 should not be viewed as limitative positions of the sensor(s) 26 as sensors 26 may be on some or all of the components, in communication with one another or with a controller of the system 30, in any of the embodiments described herein. In reaction to the any disturbance, the MR fluid actuator units 11, attached to an output 23—for example in the form of a drum—connected to a tether 24, can real-in or real-out the tether 24 to provide a target tether tension to maintain the payload W at a target position. The assembly of MR fluid clutch apparatus 10, output 23 and tether 24 relies on gravity to remain taut. Given the characteristics of MR fluid actuator units 11, the payload motion may be decoupled from the tethering aircraft F used to lift the payload W. If a disturbance causes a rapid change to the aircraft position, the tether tension may not be affected, and therefore, the payload should be isolated from such aircraft motion. If a variation in the tether tension is desired, the high bandwidth of the MR fluid actuator units 11 may provide a rapid response. In this situation, the use of MR fluid actuator units 11 used to control the tether tension in a load lifting application may minimize the undesirable payload motion with a direct control on the tether tension. The tethers 24 may have an antagonistic effect on the payload, but other biasing members or effects may be used (i.e. other types of actuator, gravity or springs). Two aircraft F are shown but multiple aircraft nF may be used to control a single payload W or multiple payloads nW.

Figure 5:
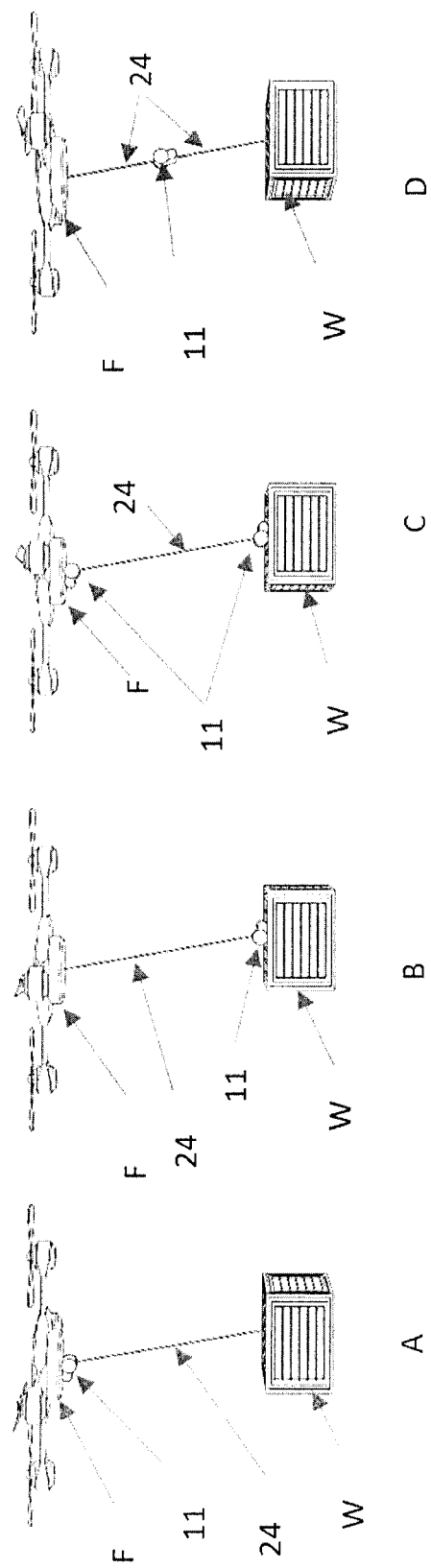
FIG. 5 is a schematic representation of various positions of the MR fluid actuator units in relation to an aircraft and payload.

Referring to FIG. 5 is a schematic representation of various positions of the MR fluid actuator unit 11 in relation the aircraft F and the payload W. Single or multiple MR fluid actuator units may be used for a single tether 24, for instance at both ends of the tether 24 as in c) of FIG. 5. In configuration A, MR actuator unit 11 is attached to the aircraft F and the free end of the tether 24 is attached to the payload W. This configuration present the advantage that the aircraft F may leave with the actuator unit 11 once the payload W is dropped at destination. This may be particularly useful for delivery aircraft. In configuration B, the actuator unit 11 is attached to the payload W and the free end of the tether 24 attached to the aircraft F. This configuration present the advantage of minimizing the weight of the aircraft F, hence minimizing its inertia and energy to control its position. This may be particularly useful when multiple aircrafts F are used to lift a payload W and multiple actuator units 11 sharing a single power source are required. In configuration C, two MR actuator units 11 are attached to both ends of the tether 24. One MR actuator unit 11 is attached to the aircraft F and one MR actuator unit 11 is attached to the payload W. This configuration may be useful when there is limited space on both sides of the tether 24 and mechanical components need to be distributed to two locations to make an optimal use of the limited space. In configuration D, MR actuator unit 11 is mounted in line with tether 24 and one free end of tether 24 is attached to the aircraft F while the other free end is attached to the payload W. This system may present the advantage of being easily adaptable to a regular aircraft F and a regular payload 104 because this concept may not require excessive modifications to any of the aircraft F or the payload W. When multiple aircraft F are used to lift one or multiple payload W, configurations A, B, C, D or other configurations may be mixed. The various positions of FIG. 5 may apply to the various configurations shown herein, such as those of FIGS. 3, 4, 7, 8, 9A, 9B, 14, 15 and 16, among others. Although not shown, sensor(s) 26 may be located at various locations to monitor the behavior of the payload W and of the aircraft F.

Figure 6:
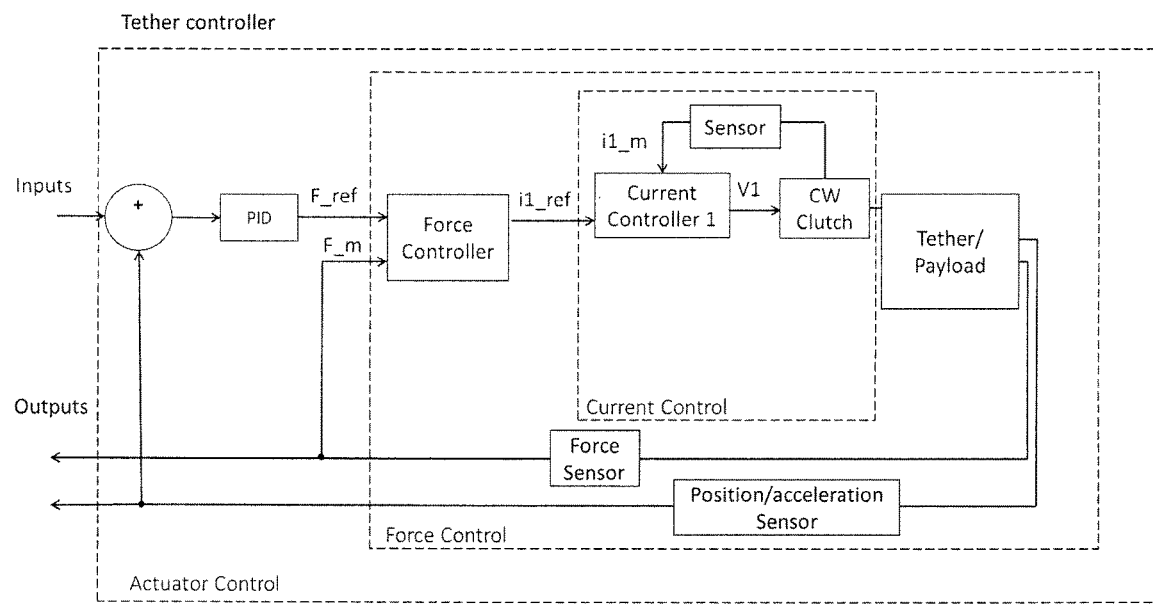
FIG. 6 is a schematic representation of controller of a control system that may be used to control the magnetorheological fluid actuator.

Referring to FIG. 6, a schematic representation of a controller system is provided, the controller system being of the type be used for accurate payload positioning using rotary MR actuator units in the arrangements and configurations described herein. The controller system may include a processor or processors (processing unit) in communication with the sensor(s) 26 and with the MR fluid actuator unit(s) 11 to control their operation. The controller system may further include a non-transitory computer-readable memory communicatively coupled to the processing unit and comprising computer-readable program instructions executable by the processing unit for performing a method for controlling a force for instance in the form of a tension of tether(s) 24 between an object (e.g., aircraft F) and a load (e.g., payload W) tethered to the object. The controller system of FIG. 6 may be used for accurate payload positioning using rotary MR fluid actuator units 11 and tethers 24. Target payload position/acceleration is input to the system and compared to actual position/acceleration of the payload W provided by position/acceleration sensor. Force controller module may calculate the force required at the tether(s) 24 and compared to the actual force provided by the force sensor. The force controller module may then adjust the current in the MR fluid cutch apparatus 10 reeling in the tether 24 using a drum 23 or other output, such as rotary-to-linear converter mechanical systems. The controller system of FIG. 6 may for instance use its non-transitory computer-readable memory communicatively coupled to the processing unit and comprising computer-readable program instructions executable by the processing unit by obtaining information indicative of a relation between the object and the load tethered to the object; characterizing the relation from the information; determining from the characterizing a level of action required to control the relation; and controlling at least one MR fluid clutch apparatus to transmit a variable amount of torque via an output of the MR fluid actuator unit to control the tension in the tether based on the level of action. The information may be provided by the sensor(s) 26, and may be one or more of distance, position, speed, acceleration, orientation, and may be compared to acceptable thresholds. For example, an acceleration of an aircraft F detected by the sensor(s) 26 may indicate an undesired vibration of the aircraft, notably due to wind gusts or unstable conditions, and this may prompt the controller system to cause an action to occur by driving the MR fluid actuator unit(s) 11 to adjust a tension in the tether(s) 24. The information may also come from the flight control system of the aircraft F. This may apply to all embodiments described herein. For example, a table is provided below illustrating a non-exhaustive list of relation between the object and the load, the cause, and a level of action of the system 30 via the controller:

| Detection from sensor(s) 26 | Relation between object and load | Level of action |
| --- | --- | --- |
| Instability of aircraft due to wind gust or other aircraft turbulences | Variable tension in tether(s) 24 that creates undesired payload movement | MR actuator unit(s) 11 operated to maintain desired tension in tether(s) 24 to position the payload correctly |
| Overload on aircraft structure due to wind gust on payload | Over tension in tether(s) 24 that may damage the aircraft structure | MR actuator unit(s) 11 operated to limit the tension in the tether to prevent over load |
| Change in trust power due to change in air density | Variable tension in tether(s) 24 that creates undesired payload movement | MR actuator unit(s) 11 actuated to maintain desired tension in tether(s) 24 to position the payload correctly |
| Change in lift force due to flight path | Variable tension in tether(s) 24 that creates undesired payload movement | MR actuator unit(s) 11 operated to maintain desired tension in tether(s) 24 to position the payload correctly |
| Instability of aircraft due to wind gust or other aircraft turbulences: Fixed tension tether 24' (FIG. 7) may limit the ability of aircraft to control its position and may trigger collision between aircrafts | Variable tension in tether(s) 24 that creates undesired payload movement | MR actuator units 11 driven to quickly reduce the tension in the tether(s) 24 to allow better aircraft control and fast aircraft repositioning |
| Transition mode between Vertical Lift Mode and Forward Flight mode. Change of aerodynamics mode of the aircraft may require change in tether tension | Variable tension in tether(s) 24 that creates undesired payload movement | MR actuator unit(s) 11 to maintain desired tension in tether(s) 24 |
| Circular moving forward flight path may require periodic tension change according to position. Not adjusting the tension may trigger undesired payload movement | Variable tension in tether(s) 24 that creates undesired payload movement | MR actuator unit(s) 11 to maintain desired tension in tether(s) 24 to position the payload correctly |

Figure 7:
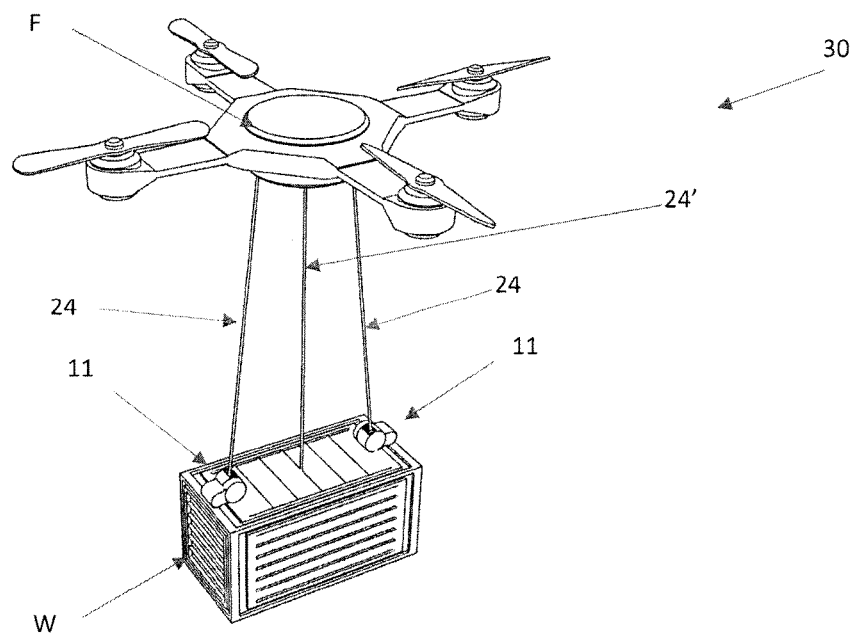
FIG. 7 is a schematic view tethered payload motion control using two tethers using two magnetorheological fluid clutch apparatuses for displacement of a payload in two DOF where the load is supported by a non-actuated load carrying tether.

Referring to FIG. 7, a schematic representation of a payload motion control system 30 using magnetorheological fluid clutch apparatuses 10 connected to the payload W via tethers 24, in parallel to a non-actuated tether 24' supporting for instance a majority of the mass of the payload W. In this configuration, multiple magnetorheological fluid actuator units 11 (two or more) may be used with a single aircraft F. In this configuration, magnetorheological fluid actuators may be used to position and/or orient the payload without having to support the complete mass of the payload W, such as balancing the load distribution of the payload W relative to the aircraft F. This configuration may present the advantage that the magnetorheological fluid actuators may be of a smaller size than if they would need to support the complete mass of the payload W. Single axis control is shown but multiple axis control may be possible by adding additional MR actuator units 11 on the payload W while attaching the free ends of additional tethers 24 to the aircraft F or vice versa. In addition, any configuration of FIG. 5 may be used in the arrangement of FIG. 7.

Figure 8:
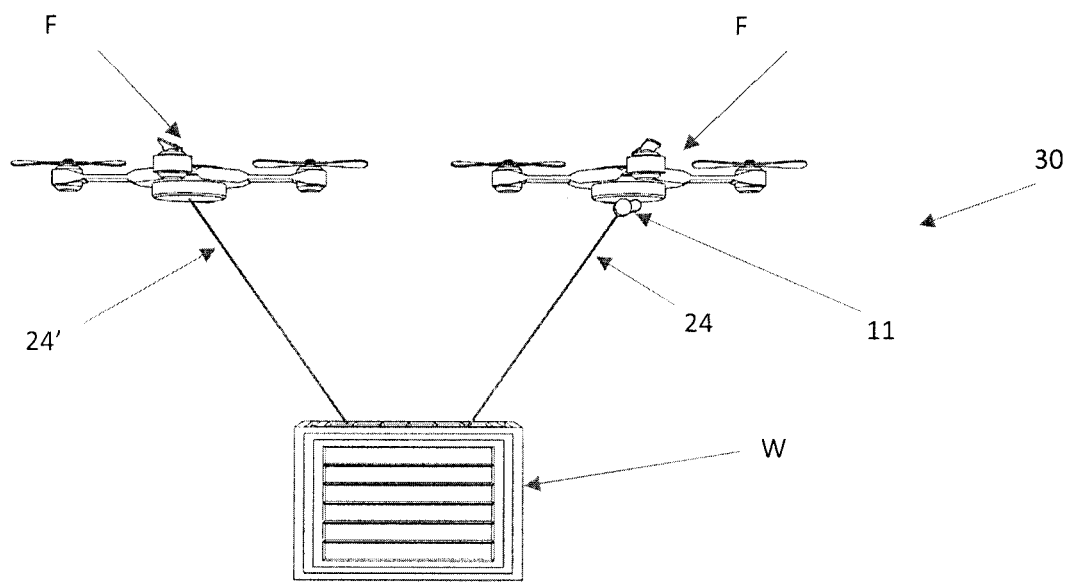
FIG. 8 is an alternative arrangement of FIG. 4 in which the MR fluid actuator units are located on the aircraft instead of on the payload.

Referring to FIG. 8, a schematic representation is shown of the payload motion control system 30 using magnetorheological fluid clutch apparatuses 10 similar to the one shown in FIG. 4. However, in FIG. 8, the MR fluid actuators are mounted on the rotorcraft, as per one arrangement of FIG. 5, and with one of the aircraft supporting the payload W by way of a fixed tether 24'. This configuration may be useful when one or more aircraft F, herein in collaborative load lifting, have to perform the delivery of a payload W, to release it and get away without having the chance to recuperate the MR fluid actuator unit 11. This configuration is an improvement over an arrangement in which only fixed tethers would link aircraft 24 to a payload W.

Figure 9A:
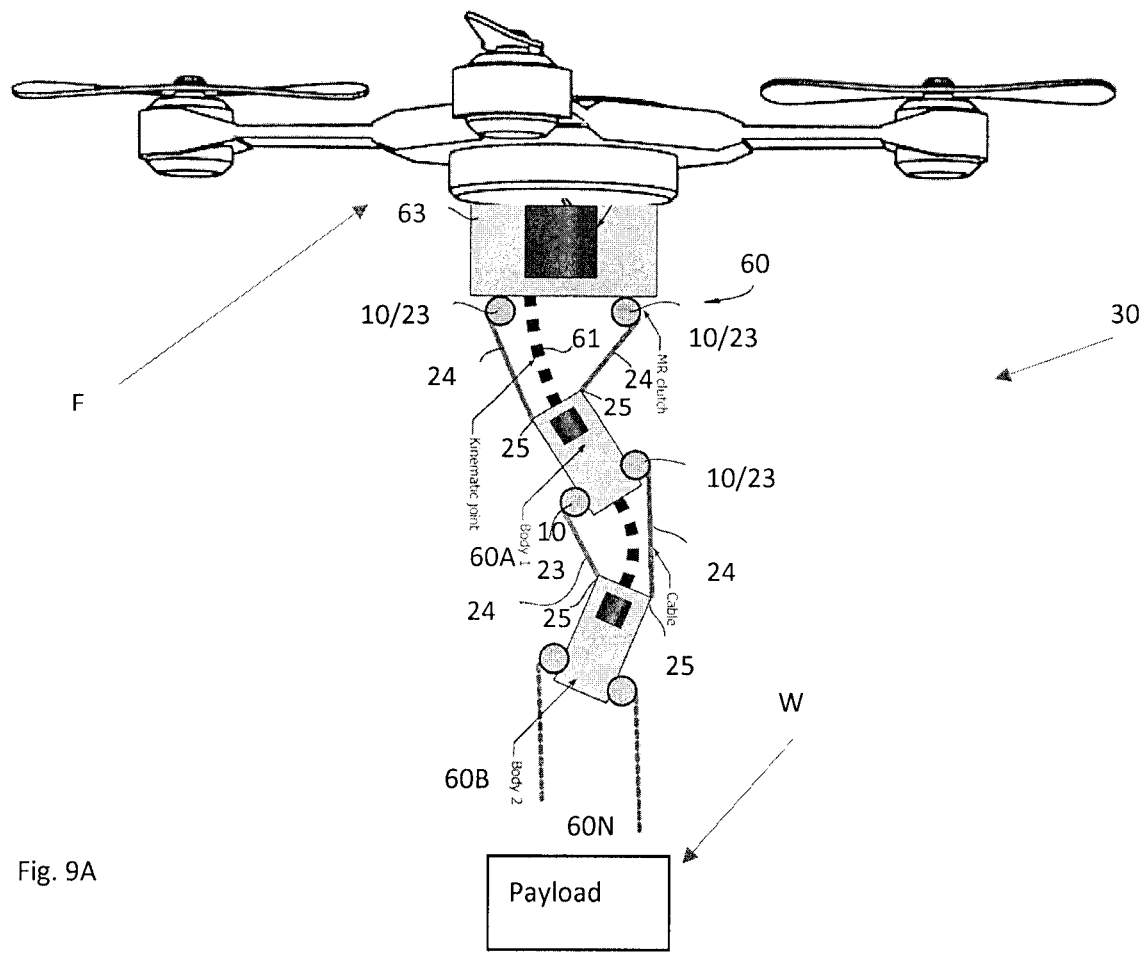
FIG. 9A is a schematic representation of a cable-driven system using a common power source with a pair of magnetorheological fluid clutch apparatuses to control movements of bodies serially connected by kinematic joints, with power sources distributed in the bodies that may be used in a tethering arrangement of the present disclosure.
Figure 9B:
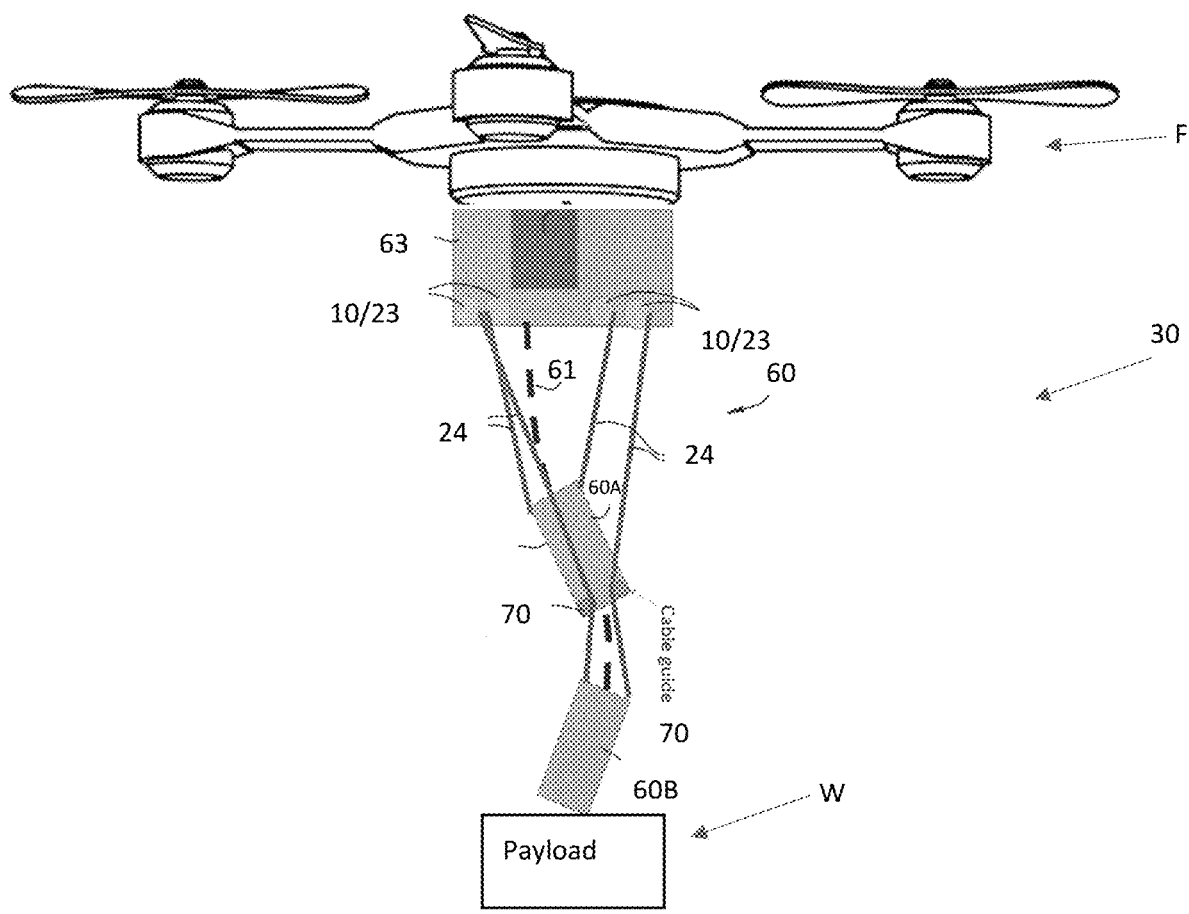
FIG. 9B is a schematic view of a cable-driven system using a common power source with a pair of magnetorheological fluid clutch apparatuses to control movements of bodies serially connected by kinematic joints, with a shared power source on a base that may be used in a tethering arrangement of the present disclosure.

Referring to FIGS. 9A and 9B, another embodiment for tethered load using involving MR fluid actuator units 11 is illustrated at 60. As the cable-driven system 60 has components in common with the cable-driven system 20 of FIG. 2, like components will bear like reference numerals. The cable-driven system 60 can be described as arms having bodies 60A, 60B, 60n (also commonly known as link members or linkages in robotics), being connected to each other by kinematic joints 61 (pivots, ball joints, sliders, etc.) and by limited-stiffness elements such as cables 24. The cable-driven system 60 has a power module or source 62 in a base 63. The power source 62 transmits its output to a pair of MR fluid clutch apparatus 10 each supporting an output wheel 23 and cable 24, with the MR fluid clutch apparatuses 10 being assembled to the base 63 so as to share the power output from the power source 62 (e.g., in similar fashion to the arrangements shown in FIGS. 2-5). The base 63 may be connected to the aircraft F as illustrated but in a reverse arrangement it may be connected to the payload W. The payload motion control system 30 working with the robotics arm may present the advantage of being enclosed while being able to apply force in more directions on the payload W. This is due to the ability of the cable-driven system 60 (the robotics arm) to control antagonistically the forces on the payload W without relying on gravity. It may allow the movement of the payload W at speeds that are higher than speeds relying solely on gravity.

The free ends of the cables 24 are connected to the body 60A, so as to exert a pulling action on the body 60A. The body 60A is constrained to given movements by its connection to the kinematic joints 61, and the pulling action of the cables 24 is controlled by the actuation of the MR fluid clutch apparatuses 10 so as to selectively control movements of the body 60A. Bodies 60A, 60B, 60n may have a similar configuration as the base 63, i.e., each with its own power source 62, MR fluid clutches 10, output wheels 23 and cables 24, serially connecting the bodies 60A, 60B, 60n. Bodies 60A, 60B, 60n may also have a different configuration than that including the base 63. For example, each or a few of the bodies 60A, 60B, 60n may have MR fluid clutch apparatuses 10, output wheels 23 and cables 24, serially connecting the bodies 60A, 60B, 60n, all of the bodies with a MR fluid clutch apparatus 10 using the power coming from the base source 62 (i.e., power could be distributed by a rotating flexible shaft). Body 60n may be connected to the payload W, as illustrated on FIG. 9A but alternatively may be connected to the aircraft F, when the base 63 is connected to the payload (reverse installation). It is to be noted that the power source of the cable-driven system 60 may be or on the aircraft F or on the payload W as connection may be installed on either end. When the power source is installed on the payload W, it may also be used to provide power to the rotorcraft F.

Alternatively, as shown in FIG. 9B, a single power source 62 in the base 63 may be shared by a plurality of MR fluid clutch apparatuses 10 on the base 63, with cable guides 65 on the proximal body 60A applying tension on the distal body 60B, etc. The cable guides 65 may be idler pulleys, posts, etc. Again, the reverse arrangement is possible.

As for FIG. 9A, tension in the limited-stiffness elements (i.e., the cables 24) is controlled by the MR fluid clutch apparatuses 10. Hence, loads applied on the bodies 60A, 60B, 60n, and their motion relative to each other can be accurately controlled with high dynamic performance. Body 60n connected to the payload W may control with high dynamics the position of payload W. Body 60n may also be equipped with an end effector that allows the release of the payload W (i.e. grip to release a parcel to be delivered). The cable-driven system 60 may then be used as a robotic arm to position a tool or device precisely, with high bandwidth.

The arms shown on FIGS. 9A and 9B may replace the cable tethers 24 used in FIGS. 3, 4, 5, 7 and 8. Multiple arms attached to multiple aircraft F may be used to support a single payload W, in collaborative load lifting. The arms shown on FIGS. 9A and 9B is that they may more accurately control a position of the payload W in space, with high dynamics of the MR fluid actuator units. This may be useful when performing a task with an aircraft in unstable flight conditions, when the payload W needs to be maintained stable. Additionally, the arms of the system 60 may be used as landing gear for an aircraft to land on the ground in unstable wind or uneven surface conditions. Multiple arms of this type may be installed on a single aircraft and arms may be of various size and functions. In example, one or multiple arms may be used as landing gear while one or multiple arms may be used for payload or tool manipulation.

Referring to FIG. 10, the MR fluid actuator unit 11 is generally shown as being constituted of a power source A (e.g., a motor), a speed reducer B, at least one of the MR fluid clutch apparatuses 10 and an output device C or mechanism. The output device C may be a rotary-to-rotary device, or a rotary-to-linear device. In FIG. 10, the MR fluid actuator unit 11 has two MR fluid clutch apparatuses 10 turning in opposite directions. In this arrangement, when in off-state mode while the input shaft is turning, the viscous torque generated by the MR fluid clutch apparatuses 10 act in opposite direction thus they are not substantially transmitted to the output device C. The output of the rotary-to-rotary device, or a rotary-to-linear device may be controlled independently of the viscous torque generated in the MR fluid clutches apparatuses 10 when in off-state mode while the input shaft is turning by applying a force on either end of the converter. The MR fluid actuator unit 11 of FIG. 10 may have an output drum as the output device C, to wind or controllably release the tether 24 shown in the previous Figures.

Referring to FIG. 10', the MR fluid actuator unit 11 shown is similar to MR fluid actuator unit 11 of FIG. 10, with the difference that it is constituted of a single MR fluid clutch apparatus 10. In this configuration, the viscous torque may be transmitted to the rotary-to-rotary device or a rotary-to-linear device, slightly reducing the controllability of the system but decreasing the number of components required. The MR fluid actuator unit 11 of FIG. 10' may be used such that the output device C winds the tether 24 against the effect of gravity on the payload P.

Referring to FIG. 10", the MR fluid actuator unit 11 shown is similar to the MR fluid actuator unit 11 of FIG. 10', with the difference that two or more MR fluid clutch apparatuses 10 are connected to the same speed reducer B, the two or more MR fluid clutch apparatuses 10 being connected to individual rotary-to-rotary device, or a rotary-to-linear device. This arrangement may be useful to control individually a human-hybrid powertrain that has more than one output. This system may also include additional MR fluid clutch apparatuses (not shown) connected to one or more rotary-to-rotary or a rotary-to-linear device in order to increase the controllability of the associated rotary-to-rotary or a rotary-to-linear device, as explained in FIG. 10. The MR fluid actuator unit 11 of FIG. 10" may be used such that the output devices C have antagonistic actions on tethers 24 connecting the aircraft F to the payload P.

Figure 11:
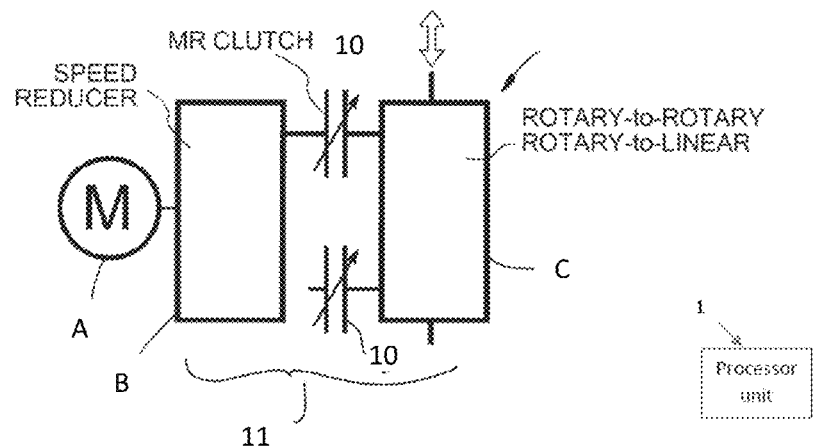
FIG. 11 is a schematic view of an MR fluid actuator unit using one or more of the MR fluid clutch apparatus of FIG. 1, one of the MR fluid clutch connected to a fixed part and one MR fluid clutch apparatus connected to the speed reducer that may be used in a tethering arrangement of the present disclosure.

Referring to FIG. 11, an alternative construction of the MR fluid actuator 11 is shown, in which a single MR fluid clutch apparatus 10 is connected to the speed reducer and where a second MR fluid clutch apparatus 10 is connected to another component. This construction may be useful for the second clutch apparatus to reduce the effect on the output of the viscous torque generated by the first MR fluid clutch apparatus 10 that is connected to the speed reducer, increasing the controllability of the system.

Figure 12:
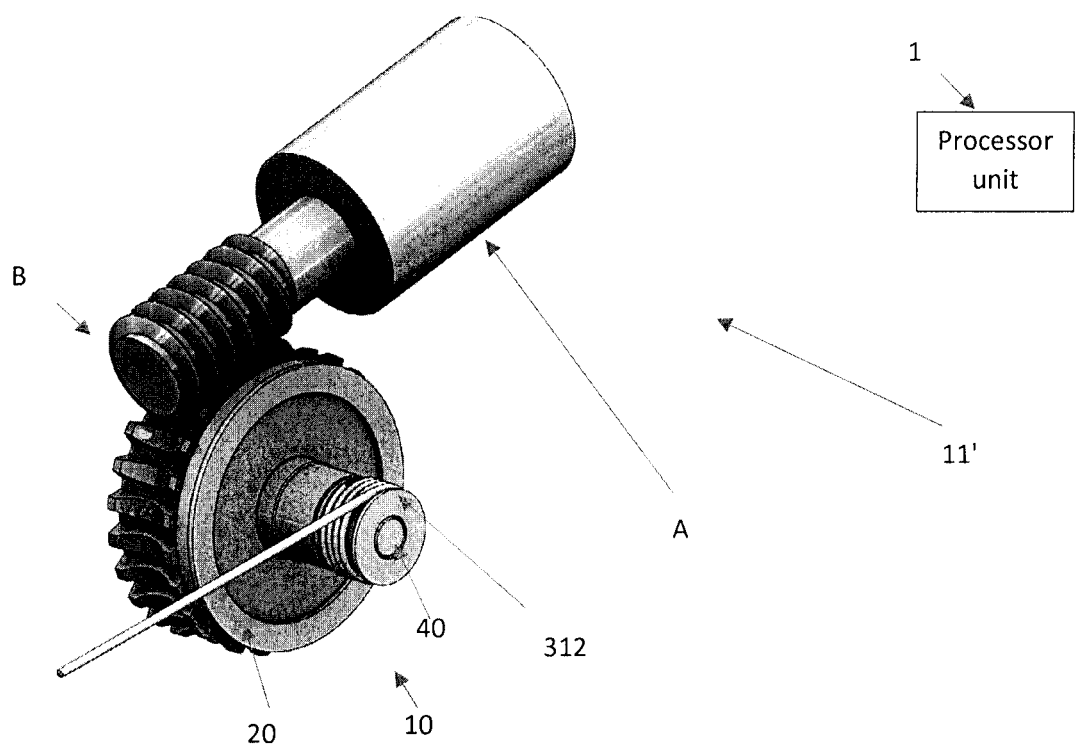
FIG. 12 is a perspective view of a MR fluid actuator unit with a reduction mechanism that may be used in a tethering arrangement of the present disclosure.

Referring to FIG. 12 there is shown another MR fluid actuator 11' that may be used in the tethered payload arrangements described herein. A motor A is connected to a speed reducer B (e.g. a worm gear is illustrated) that is connected to the input 20 of a MR fluid clutch apparatus 10 used to transmit torque to the output 40 of the MR fluid clutch apparatus 10. The output 40 is connected to a pulley 23 about which a cable may be attached. A cable is illustrated here but other types of tensioning devices may be used (i.e. chain, belt, hydraulic piston, . . . ).

Figure 13:
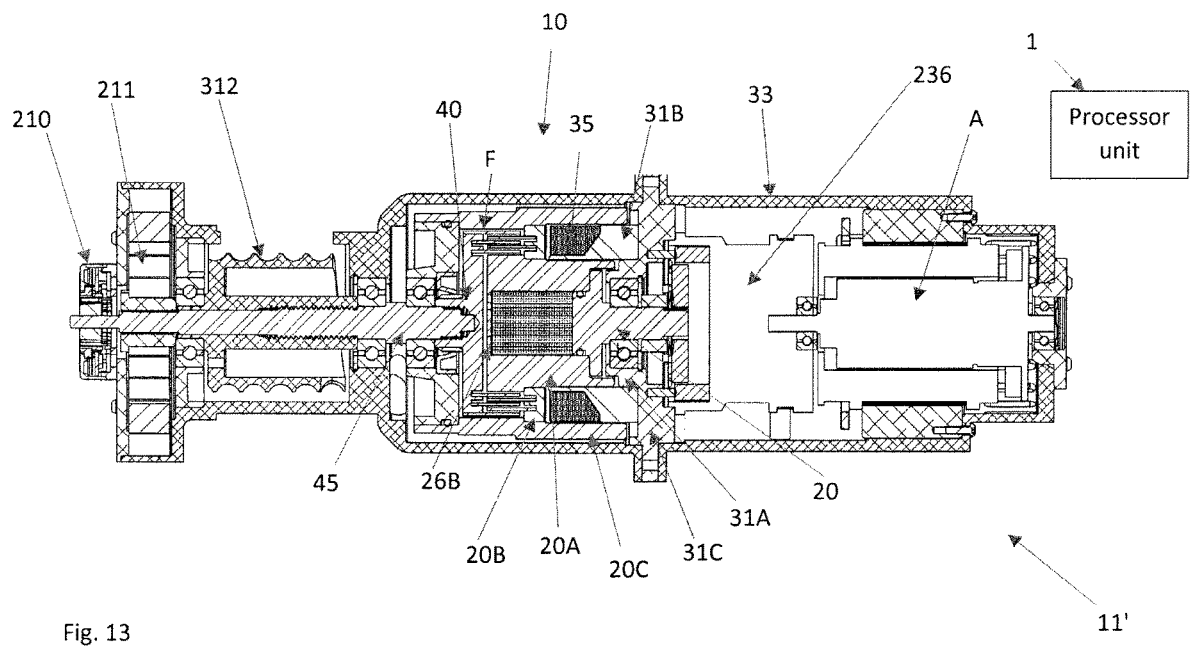
FIG. 13 is a sectional view of a MR fluid actuator unit with a reduction mechanism that may be used in a tethering arrangement of the present disclosure.

Referring to FIG. 13, there is shown an integration of a MR fluid actuator unit 11' that may be used in the tethered payload arrangements described herein, but with an inline arrangement instead of an angled arrangement as in FIG. 12. In this arrangement, instead of a worm gear speed reducer B as in FIG. 12, the speed reducer B may be of planetary gear device. In the described embodiment, a sensor 210 is present to provide information about the angular position of the pulley 312 and a recoil spring 211 is present in order to maintain tension in the cable (not illustrated) if the MR fluid actuator unit 11' is not powered. The outer face 33 is connected to the radial wall 31C and then to 31B and 31A, and is thus the fixed component of the MR fluid clutch apparatus 10 relative to the structure.

Figure 14:
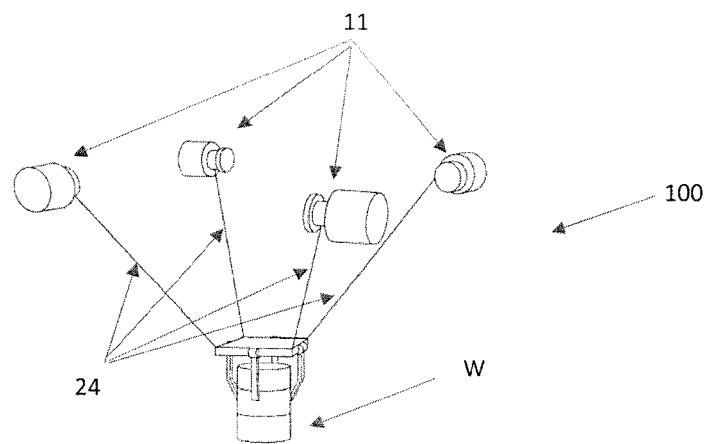
FIG. 14 is a schematic representation of an under-constrained cable robot using magnetorheological fluid actuator units that may be used with a tethering controller of the present disclosure.

Referring to FIG. 14, there is shown payload motion control system 100 that is under-constrained. Cables are coupled to MR fluid actuator units 11 that may control the tension of the tethers 24 while minimizing the variation coming from the inertia of the actuator units 11. Each actuator unit 11 may be powered by individual motors or multiple actuators 11 may be powered by a single source of power as shown in FIG. 2. Payload W position may be controlled with high bandwidth in multiple DOFs by the payload motion control system 100. In some conditions, the position of the payload W may not be controlled with acceleration over one g since the payload motion control system 100 relies on gravity for some movements, as the only downward force vector in FIG. 14 is gravity.

Figure 15:
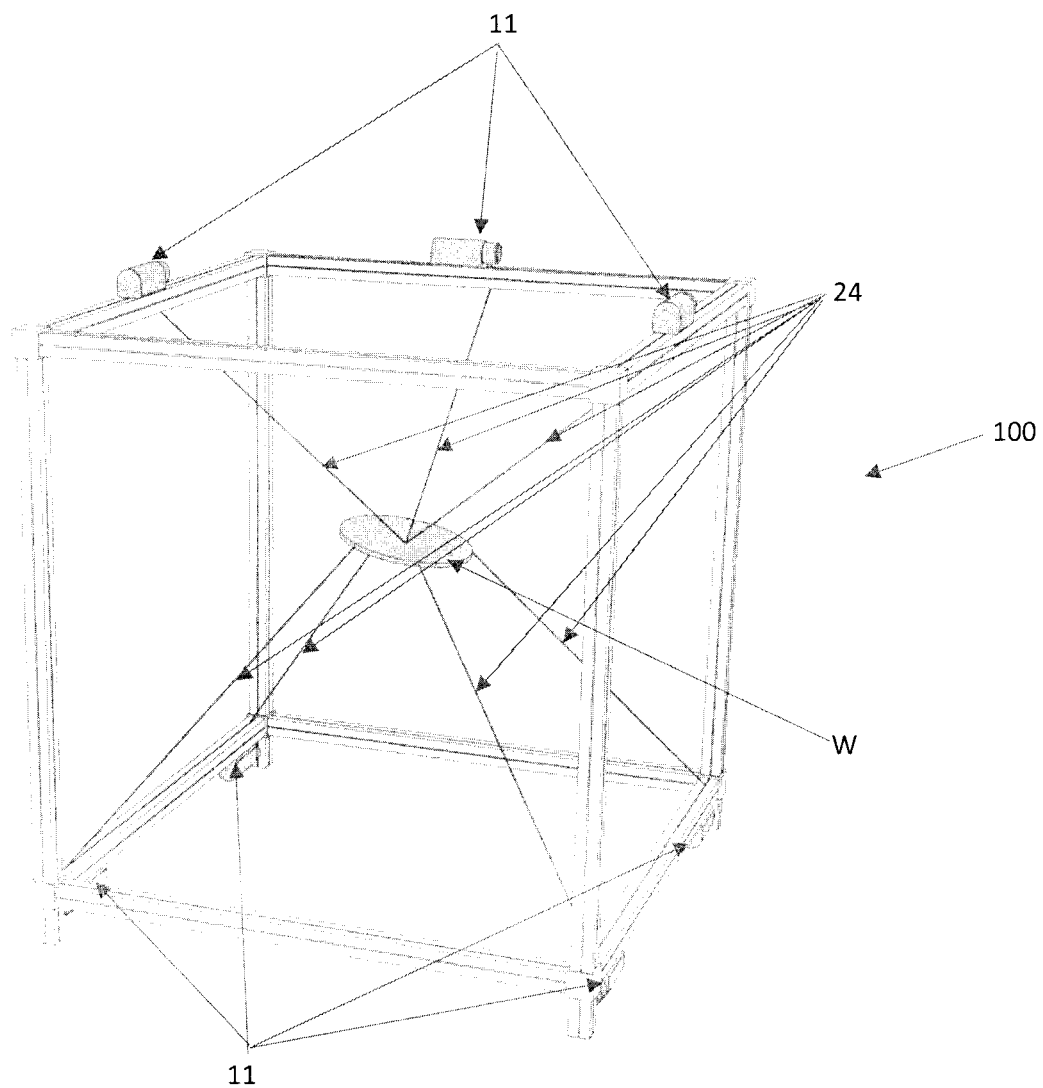
FIG. 15 is a schematic representation of an a fully constrained cable robot using magnetorheological fluid actuator units that may be used with a tethering controller of the present disclosure.

Referring to FIG. 15, there is shown a payload motion control system 100 that is constrained. In this arrangement, tension in the tethers 24 may be more critical than in the under constrained payload motion control 100 of FIG. 14 because tension in antagonistic tethers 24 may create overload on the structure (herein shown as a cube of frame members, but any other structure would work, including walls of a room) supporting the actuator units 11 or on the payload W itself. In this configuration, payload motion control system 100 may control payload position with higher acceleration than the under constrained version of FIG. 14. It may accelerate the payload 102 over one g in multiple DOF.

Figure 16:
FIG. 16 is a schematic representation of an under constrained cable robot using magnetorheological fluid actuator units connected to a human that may be used with a tethering controller of the present disclosure.

Referring to FIG. 16, there is shown an under constrained payload motion control system 100 such as the one of FIG. 14, as connected to a human payload W. Such device may be used to replicate a human being flying in a virtual world. Limbs of the user may be connected at multiple points using harnesses. By controlling the tension on the different tethers 24 attached to different points of the human payload W, free fall realism may be achieved.

Figure 17A:
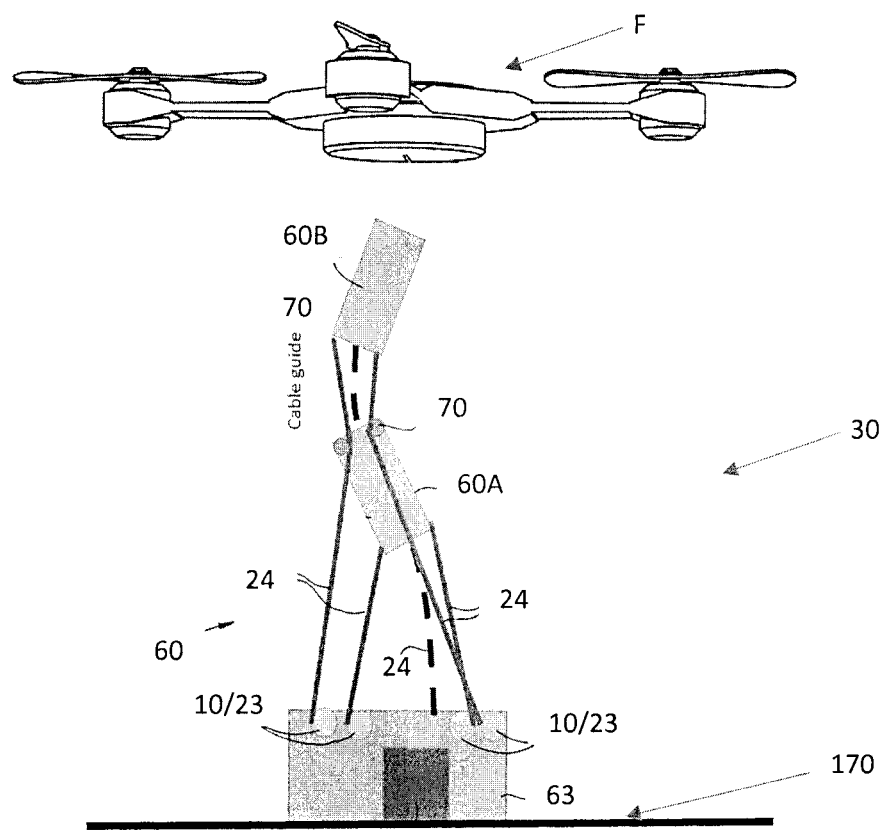
FIG. 17A is a schematic representation of an aircraft landing platform using magnetorheological fluid actuators robotic arm that may be used with a tethering controller of the present disclosure.

Referring to FIG. 17A, there is shown a reverse installation of a payload motion control system 30. In this configuration, payload motion control system 100 of FIG. 9A or 9B may be attached to the ground instead of being attached to an aircraft F, such a rotorcraft of limited weight such as a drone. Payload motion control system 30 may be used to catch an aircraft F with high bandwidth. This configuration may be useful for an aircraft F to land when there are changing winds that reduce the controllability of the aircraft F and that would impede a precise landing. This configuration may also be useful to land an aircraft F on an unstable platform 170 (e.g., a boat). With the proposed arrangement, the payload motion control system 30 may catch the aircraft F in order to assist it in landing. The high bandwidth controllability of this landing system would present the advantage that the system would be able to track and catch the aircraft F while maintaining low impedance (soft mode) and transition to high impedance to impose a position to the aircraft 103 when the aircraft 103 is coupled to the payload motion control system 30 using a gripper (not shown) or another mating device (not shown) mounted on the body one of the body part 60 (i.e. on the last body part 60B). It is to be noted that the cable-driven system 60 may be equipped with electrical connections to provide power to the aircraft 103 during take-off and/or landing. Cable-driven system 60 may also assist rotorcraft F in take-off by providing an impulse. This may be useful to save energy of the rotorcraft F during operation close to the ground. The last member 60B, 60n may be a platform. Multiple systems 60 may be used to support and orient the platform 170. This type of device may be useful to prevent ground resonance of aircrafts.

Figure 17B:
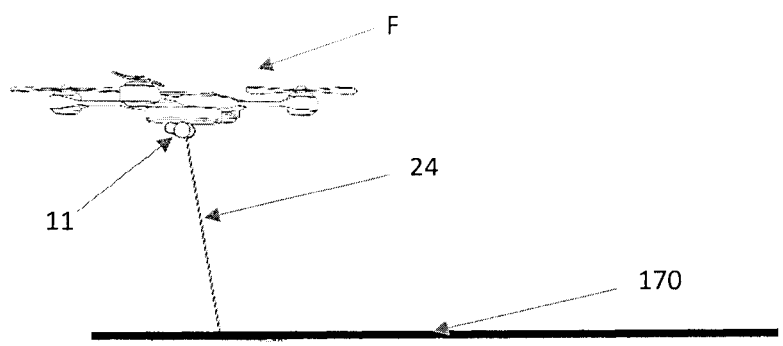
FIG. 17B is a schematic representation of an aircraft landing aid system using magnetorheological fluid actuator that may be used with a tethering controller of the present disclosure.

Referring to FIG. 17B, there is shown a simple aircraft landing aid using MR fluid actuator unit 11. On the schematic, the aircraft F is equipped with a MR fluid actuator unit 11 that may reel a tether 24. Free end of tether 101 may be dropped on the ground for an operator or robotic device (not shown) to catch the free end. Once the free end is secured to the ground or the platform, the MR fluid actuator unit 11 may be used to pull the rotorcraft to the ground or moving platform 170 using high bandwidth controllability. Tension in tether 24 may be kept constant and force may be released with high bandwidth if required, providing a safe landing assist method to the rotorcraft F.

Figure 18:
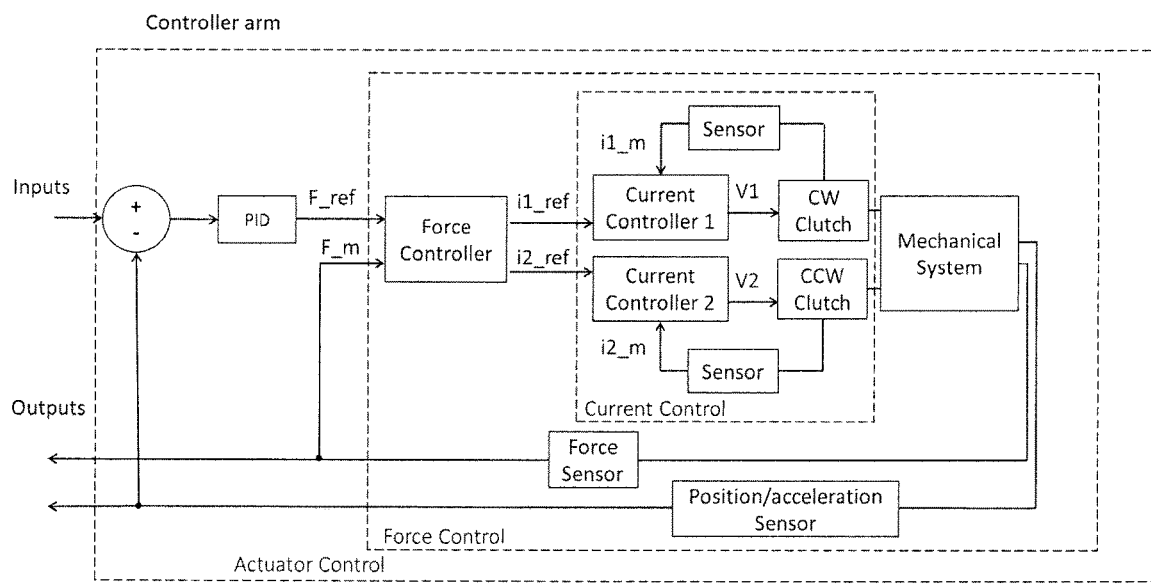
FIG. 18 is a schematic representation of tethering controller that may be used to control the an antagonist MR fluid actuator unit.

Referring to FIG. 18, there is shown a controller system that may be used to control the an antagonist MR fluid actuator unit 11 of FIGS. 9A, 9B, 15, 17, 19A, 19B, 20 where one actuator unit 11 can have a reciprocal effect on an antagonist actuator unit 11 without having limitation due to gravity. The controller system has components and modules similar to those of the controller system of FIG. 6.

Figure 19A:
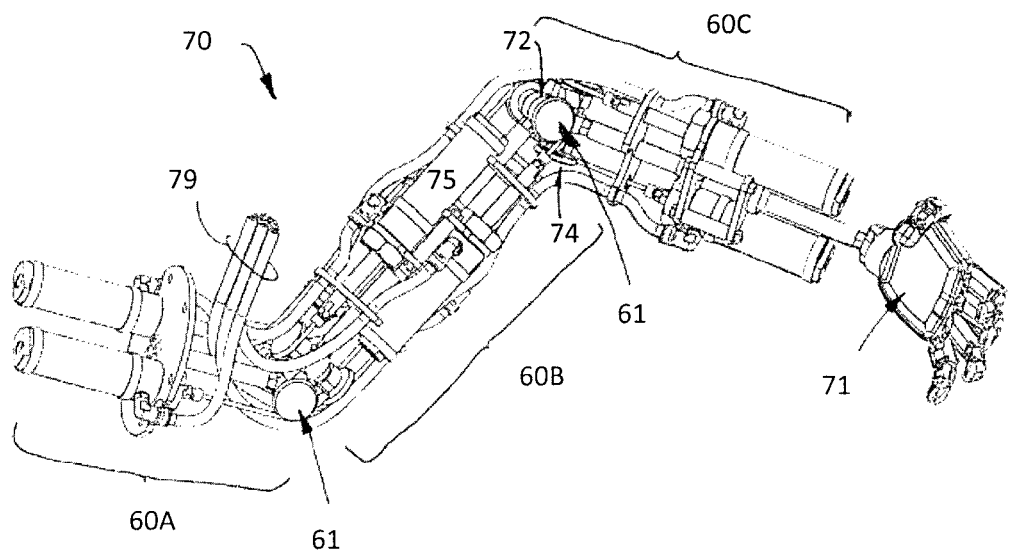
FIG. 19A is a schematic representation of an alternative configuration of dynamic motion control system using hybrid cable hydraulic transmission that may be used with a tethering controller of the present disclosure.
Figure 19B:
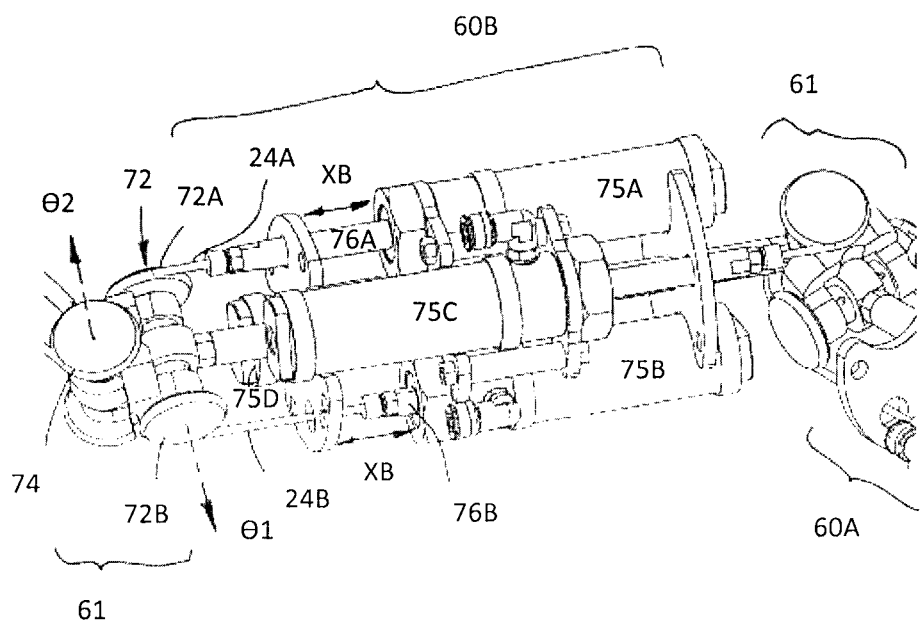
FIG. 19B is a detailed view of a member of FIG. 19A.
Figure 19C:
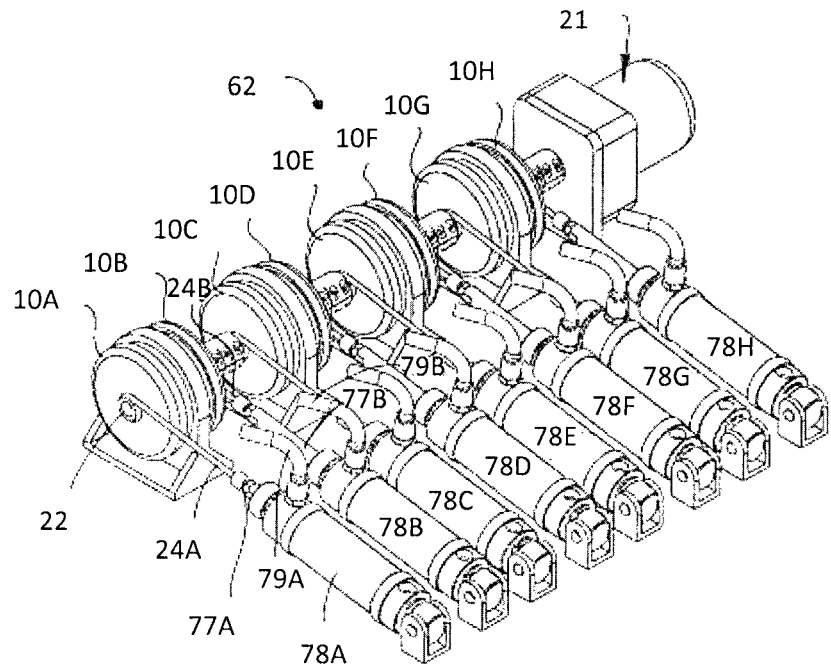
FIG. 19C is a schematic representation of a power module used to control the payload motion control system of FIGS. 19B and 19C.

Referring to FIG. 19A-19C, an alternative embodiment to the cable systems of FIGS. 9A and 9B is shown, in a robotic arm 70. The robotic arm 70 is of the type having a gripper 71 at its output end. The gripper 71 is one among numerous possible tools that may be used as the end of the robotic arm 70, and is simply provided as an example. The gripper 71 is for example actuated independently from the actuation of the robotic arm 70, as the gripper 71 need only displace its fingers, and be rotated at its wrist. For illustrative purposes, other tools that could be used as alternatives to the gripper 71 include pliers, a drill, pincers, to name but a few.

The robotic arm 70 is shown as being a 4-DOF arm with bodies 60A, 60B and 60C, in that 4 rotational DOFs are provided between the base 63 and the part of the body 60C supporting the gripper 71. Again, this is one of numerous possibilities, as it has been explained for FIGS. 9A and 9B that there may be more or fewer bodies, with more or fewer DOFs, the DOFs being translations and/or rotations.

For ease of explanation and to avoid redundancies, only the intermediate body 60B, shown in FIG. 19A as being between body 60A and 60C, is described in detail with reference to FIG. 19B, but the base body 60A and the end body 60C have similar components. The intermediate body 60B in shown being connected to the end body 60C by way of the kinematic joints 61, the kinematic joints 61 incorporating several components. The kinematic joint 61 may indeed include a first rotational joint 72 fixed to the body 60B, the first rotational joint 72 having a pair of pulleys or equivalent, 72A and 72B, both concurrently rotatable about axis θ1. The pulleys 72A and 72B are concurrently rotatable as they are fixed to one another. A rotation of the pulleys 72A and 72B will result in a rotation of carriage 73, again about axis θ1. A mirror or similar arrangement is also provided at the end of the end body 60C interfaced to the intermediate body 60B, as shown by the rotational joint 74, the carriage 73 being shared by rotational joints 72 and 74 as part of the kinematic joint 61. Therefore, the kinematic joint 61 provides two of the four rotational DOFs of the robotic arm 70, about axes θ1 and θ2, respectively by way of joint 72 and joint 74.

The pulleys 72A and 72B are respectively connected to cables or equivalents 24A and 24B, but in opposite winding orientations, such that cable 24A provides a clockwise rotation, and cable 24B provides the antagonistic counter-clockwise rotation. It is contemplated to route the cables 24A and 24B directly to the MR fluid clutch apparatuses, using cable guides such as the one shown at 70 in FIG. 9B. However, the use of an hydraulic transmission is shown as an alternative. In given systems involving more DOFs and a wider range of movement, an hydraulic transmission may be a practical alternative as routing of hydraulic hoses may be less complex than cable routing.

For the rotational joint 72, the antagonistic actuation is provided by slave cylinders 75A and 75B. Slave cylinder 75A has a rod 76A displaceable along XA, to pull the cable 24A and thus rotate the pulley 72A, i.e., the components affixed with "A". Likewise, slave cylinder 75B has a rod 76B displaceable along XB, to pull the cable 24B and thus rotate the pulley 72B, i.e., the components affixed with "B". In the description, cables are used here in order to provide greater amplitude of movement. However, similarly to a mechanism described subsequently for FIG. 20, the piston rods 76A, 76B, 76C could be attached directly to the pulleys 72A, 72B, 72C, provided an appropriate joint (e.g., swivel joint) is fitted between the pistons rods 76 and the corresponding pulley 72, and provided that the cylinders 75 may rotate relative to the structural components of the body 60. Each of the slave cylinders 75A and 75B has its own dedicated MR fluid clutch apparatus 10, as shown later in FIG. 19C, providing the necessary hydraulic pressure and fluid movement to cause antagonistic force control, which may lead to controlled movements of the rotational joint 72.

FIG. 19B also shows another pair of slave cylinders 75C and 75D, oriented toward the base body 60A. The slave cylinders 75C and 75D control another rotational DOF, in the same manner as described for the rotational joint 72. The components at the right-hand side of the figures are essentially the same as on the left-hand side, whereby the operation of the right-hand side is self-explanatory. The body 60B is shown as using a frame member 60B1 to act as a rigid link between the kinematic joints 61. The body of the cylinders 75 could also be used as frame members, along with connecting plates and associated hardware. Any possible frame arrangement is considered and usable to ensure that the rotatable components, i.e., the rotational joints 72 and 74 inter alia, may rotate while their axes are fixed in position.

Referring to FIG. 19C, the generic power module 62 is illustrated as having the electric motor 21 driving the output shaft 22. The power module 62 is used to actuate and control the movements of the robotic arm 70. Advantageously, the weight of the power module 62 is not supported by the robotic arm 70, and may instead be on a separate structure, such that the robotic arm 70 need not bear the weight of the power module 62. MR fluid clutch apparatuses 10A-10H, concurrently referred to as 10, are each secured to the output shaft 22. Each MR fluid clutch apparatus 10 has a pulley or equivalent 23, about which is wound a cable or equivalent 24, in similar fashion to the previously described embodiments. By way of the cables 24, each MR fluid clutch apparatus 10 pulls on a respective rod 77 (from rods 77A-77H). The rods 77 are each associated with a master cylinder 78 (i.e., one of the cylinders 78A-78H), whereby the pull will generate an hydraulic flow or pressure supply at the hydraulic hose 79 (i.e., pipe, tube, tubing, etc). Looking at FIG. 19A, the harness of hoses 79 (i.e., 79A-79H) diverges into the individual hoses 79 each reaching an associated slave cylinder, as shown in FIG. 7A, but not in FIG. 19B in which the hoses 79 are absent to simplify the figure. For example, the master cylinders 78A and 78B in FIG. 19C may respectively be connected to the slave cylinders 75A and 75B in FIG. 7B. Hence, the master cylinders 78 convert a mechanical pull produced by the MR fluid clutch apparatuses 10 into a hydraulic pressure, the hydraulic pressure being reconverted into a mechanical pull by the slave cylinders 75, to cause the antagonistic forces and movements. The robotic arm 70 therefore benefits from the dynamic response of MR fluid clutch apparatuses 10 in its movements. The multiple DOFs of the robotic arm 70 may be actuated using a single power source, namely the motor 21, with the control of the movements provided by the selective coupling input from the MR fluid clutch apparatuses 10, operated by a controller (including a processor unit and appropriate control modules).

Each pair of antagonistic slave cylinders (e.g., the pair 75A and 75B) provide antagonistic forces, when one of the associated MR fluid clutch apparatuses, 10A, causes a pulling action by pulling on the cable 24A (and thus winding the cable 24A on the pulley 23A), the other MR fluid clutch apparatus 10B may be in controlled slippage. Controlled slippage causes a release in pressure in the hydraulic transmission and cable 24B. The cable 24B is consequently wound about the pulley 72B (FIG. 19B). Consequently, the rod 76B is pulled by the cable 24B, whereby the slave cylinder 75B becomes temporarily master to the master cylinder 78B (FIG. 19C). This results in a retraction of the rod 77B into the master cylinder 78B, and an unwinding of the cable 24B at the MR fluid clutch apparatus 10B. Therefore, as suggested previously, the electric motor 21 will not be transmitting full forces to all tensioning sets simultaneously, due to the antagonistic operation of pairs of the tensioning sets.

Figure 20:
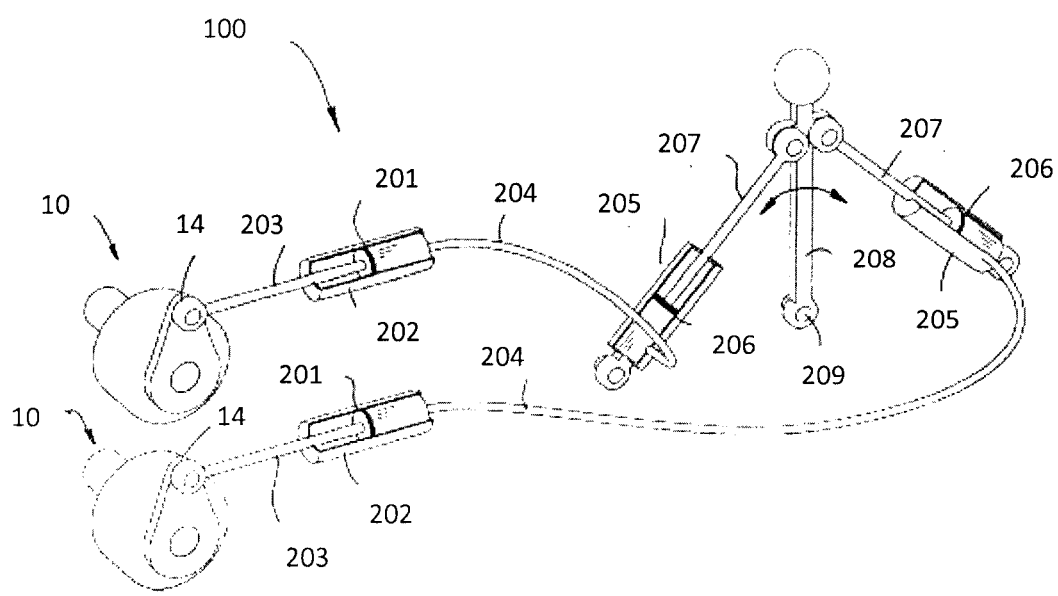
FIG. 20 is a schematic representation of a piston base payload control system that may be used with a tethering controller of the present disclosure.

Referring to FIG. 20, a system operated with a similar antagonistic approach is shown as a payload motion control system 30 and/or 100. However, instead of cables, the payload motion control system 30/100 uses fluid pressure to actuate movements of an output, by way of hydraulic transmission units, similar to those employed in the robotic arm 70 of FIGS. 19A-19C. In the illustrated embodiment, the payload motion control system 30 and/or 100 has a pair of MR fluid clutch apparatuses 10 which, although not shown, may receive power from a common power source, for instance as in FIG. 2 or in FIG. 19C. However, for simplicity, the power source and associated transmission is not illustrated in the FIG. 20. The driven member 14 of each MR fluid clutch apparatus 10 is an arm pivotally connected to a piston 201 of a master cylinder 202, by way of a rod 203. The payload motion control system 30 and/or 100 may further have a flexible hose 204 extending from the master cylinder 202 to another cylinder, the slave cylinder 205. This slave cylinder 205 has a piston 206 and its rod 207 pivotally connected to an output 208 pivotally mounted to a ground at pivot 209.

In operation, the actuation of one of the MR fluid clutch apparatuses 10 results in movement of its associated piston 201 in the respective master cylinder 202. Pressurized fluid may as a result travel from the master cylinder 202, through the hose 204, and into the slave cylinder 205. This will cause a movement of the piston 206 that will push the output 208. The actuation of the other of the MR fluid clutch apparatuses 10 may result in a reciprocating movement of the output 208, in this illustrated embodiment of one rotational DOF.

Accordingly, the payload motion control system 30 and/or 100 operates in a similar antagonistic approach as the systems 60 or 70 yet with a pushing action (compressive load) instead of a pulling action (tensioning load) as when cables are used, whereby the payload motion control system 30 and/or 100 has compressive sets as opposed to tensioning sets. The payload motion control system 30 and/or 100 may be arranged to provide additional degrees of freedom of output, for example with an arrangement similar to that of FIGS. 9A, 9B, 17, 19A and 19B. As an alternative to the presence of two MR fluid clutch apparatuses 10 in FIG. 20, the payload motion control system 100 may use other forces to perform the antagonistic opposition, such as a spring, gravity, etc, against the action of one of the MR fluid clutch apparatuses 10.

It is to be noted that both hoses could be plugged in different chambers of a same piston body, at the input or the output, the antagonistic opposition being applied on the piston, the rod transmitting the force to the end effector.

In yet another embodiment, it is considered to provide a pair of one tensioning set (e.g., as in systems 60 or 70) with one compressive set (e.g., as in payload motion control system 30 and/or 100), to provide antagonistic forces on a same DOF of an output. Among possibilities offered by such an arrangement, the anchor point for the tensioning set and the compressive set can be on the same side, same area and/or same location on the output. This may be a valuable features when space in scarce on one side of the output.

Any one of these payload motion control system 30 and/or 100 may use a brake that can immobilise the output in the driven position for an extended period of time without having to activate the MR fluid clutch apparatus 10 that leads to the driven position. The purpose of this is to limit the wear of the MR fluid in the MR fluid clutch apparatus 10 while the system is under the influence of a spring force or external force while the system is kept in an immobile state.

The invention claimed is:

1. A system for controlling a tension of a tensioning member between an object and a load tethered to the object comprising:
    a fixed tether cable connected between the object and the load;
    at least one tensioning set being in parallel to the fixed tether cable and having
        at least one magnetorheological (MR) fluid actuator unit including at least one torque source and at least one MR fluid clutch apparatus coupled to the at least one torque source to receive torque from the at least one torque source, the MR fluid clutch apparatus containing a MR fluid and having an electromagnet being controllable to vary an apparent viscosity of the MR fluid to transmit a variable amount of torque via an output of the MR fluid actuator unit, and
        a tensioning member being connected to the output so as to be pulled by the output upon actuation of the magnetorheological fluid clutch apparatus, a free end of the tensioning member adapted to exert a pulling action when being pulled by the output;
    at least one sensor for providing information indicative of a relation between the object and the load tethered to the object; and
    a controller for controlling the at least one MR fluid clutch apparatus in exerting the pulling action based on said information, the controller configured for adjusting a strength of a magnetic field generated by the electromagnet based on said information.

2. The system according to claim 1, wherein the output member and the tensioning member are any one of a wheel, drum or pulley and cable or tendon, and a chainring and chain.

3. The system according to claim 1, wherein the at least one sensor includes at least one inertial sensor adapted to determine an acceleration of at least one of the object and the load.

4. The system according to claim 1, wherein the at least one sensor includes at one of a global navigation satellite system and of a GPS device to determine at least a location of at least one of the object and of the load.

5. The system according to claim 1, further comprising a gear reduction system between the torque source and the at least one MR fluid clutch apparatus.

6. The system according to claim 1, wherein the free end of the tensioning member is connected to one of the object and of the load, and wherein the at least one of the MR fluid actuator unit is connected to the other of the of the object and of the load.

7. The system according to claim 1, wherein the object is an aircraft tethering the load.

8. The system according to claim 1, comprising two of the at least one tensioning set on opposite sides of the fixed tether cable.

9. A system for controlling a tension of a tensioning member between an object and a load tethered to the object comprising
    at least two tensioning sets, each said tensioning set having
        at least one magnetorheological (MR) fluid actuator unit including at least one torque source and at least one MR fluid clutch apparatus coupled to the at least one torque source to receive torque from the at least one torque source, the MR fluid clutch apparatus containing a MR fluid and having an electromagnet being controllable to vary an apparent viscosity of the MR fluid to transmit a variable amount of torque via an output of the MR fluid actuator unit, and a tensioning member being connected to the output so as to be pulled by the output upon actuation of the magnetorheological fluid clutch apparatus, a free end of the tensioning member adapted to exert a pulling action when being pulled by the output;

at least one sensor for providing information indicative of a relation between the object and the load tethered to the object; and a controller for controlling the MR fluid clutch apparatuses in exerting the pulling action based on said information, the controller configured for adjusting a strength of a magnetic field generated by the electromagnet based on said information, the controller for controlling the MR fluid clutch apparatuses for a first of the tensioning sets to provide a force on the output antagonistic to a transmission of the pulling action of a second of the tensioning sets on the output.

10. The system according to claim 9, wherein at least two of the tensioning sets are configured to share the at least one sensor.

11. The system according to claim 9, wherein the object is an aircraft tethering the load.

12. The system according to claim 1, wherein the at least one sensor detects at least one of a speed and an acceleration of one of the object and the load beyond a predetermined threshold from the information indicative of the relation, and the controller controls the at least one MR fluid clutch apparatus to adjust a tension in the cable to isolate one of the object and the load from the speed and/or the acceleration.

13. A method for controlling a force between at least two aircrafts and a load tethered to the at least two aircrafts, comprising a processing unit; and a non-transitory computer-readable memory communicatively coupled to the processing unit and comprising computer-readable program instructions executable by the processing unit for:

obtaining information indicative of a relation between the at least two aircrafts and the load tethered to the at least two aircrafts;

characterizing the relation from the information;

determining from the characterizing a level of action required to control the relation; and controlling at least one MR fluid clutch apparatus to transmit a variable amount of torque via an output of the at least one MR fluid clutch apparatus to control a tension on at least one tensioning member between the load and the at least two aircrafts, including adjusting a strength of a magnetic field to vary an apparent viscosity of a MR fluid to control the force based on the level of action.

14. The method according to claim 13, wherein obtaining information indicative of a relation includes obtaining at least one of a speed and an acceleration of one of the object and the load.

15. The method according to claim 14, wherein characterizing the relation from the information comprises comparing the speed and/or acceleration to a predetermined threshold.

16. The method according to claim 15, wherein determining the level of action comprises determining to isolate one of the object and the load from the speed and/or the acceleration.

17. The method according to claim 13, wherein to control a tension on at least one tensioning member includes to control a tension on at least one cable tether.

* * * * *